United States Patent [19]

Pease et al.

[11] Patent Number: 5,326,104
[45] Date of Patent: Jul. 5, 1994

[54] SECURE AUTOMATED ELECTRONIC CASINO GAMING SYSTEM

[75] Inventors: Logan L. Pease, Reno; Eugene T. Bond, Las Vegas; Dwight E. Crevelt, Las Vegas; Verne F. Holmes, Jr., Las Vegas, all of Nev.

[73] Assignee: IGT, Reno, Nev.

[21] Appl. No.: 831,250

[22] Filed: Feb. 7, 1992

[51] Int. Cl.⁵ .............................................. A63F 9/22
[52] U.S. Cl. ............................. 273/138 A; 273/85 CP; 273/269; 902/23
[58] Field of Search ................ 273/138 A, 269, 237, 273/85 CP, DIG. 28; 364/412; 902/23

[56] References Cited

U.S. PATENT DOCUMENTS

| | | |
|---|---|---|
| 3,786,234 | 1/1974 | Trent et al. |
| 3,810,627 | 5/1974 | Levy. |
| 3,906,447 | 9/1975 | Crafton. |
| 3,909,002 | 9/1975 | Levy. |
| 4,033,588 | 7/1977 | Watts. |
| 4,108,364 | 8/1978 | Tanaka et al. |
| 4,206,920 | 6/1980 | Weatherford et al. |
| 4,254,404 | 3/1981 | White .................... 273/138 A |
| 4,275,456 | 6/1981 | Tanaka et al. |
| 4,283,709 | 8/1981 | Lucero et al. |
| 4,322,612 | 3/1982 | Lange. |
| 4,323,770 | 4/1982 | Dieulot et al. |
| 4,335,809 | 6/1982 | Wain. |
| 4,467,424 | 8/1984 | Hedges et al. |
| 4,494,197 | 1/1985 | Troy et al. |
| 4,517,558 | 5/1985 | Davids. |
| 4,527,798 | 7/1985 | Siekierski et al. |
| 4,531,187 | 7/1985 | Uhland .................. 273/138 A |
| 4,575,622 | 3/1986 | Pellegrini. |
| 4,636,951 | 1/1987 | Harlick. |
| 4,669,730 | 6/1987 | Small. |
| 4,689,742 | 8/1987 | Troy et al. |
| 4,700,296 | 10/1987 | Palmer, Jr. et al. |
| 4,727,544 | 2/1988 | Brunner et al. |
| 4,775,937 | 10/1988 | Bell. |
| 4,782,468 | 11/1988 | Jones et al. |
| 4,815,741 | 3/1989 | Small. |
| 4,856,787 | 8/1989 | Itkis ........................ 273/269 |
| 4,875,164 | 10/1989 | Monfort. |
| 4,880,237 | 11/1989 | Kishishita. |
| 5,042,809 | 8/1991 | Richardson ............ 273/85 CP |
| 5,159,549 | 10/1992 | Hallman, Jr. et al. ... 273/138 A |

FOREIGN PATENT DOCUMENTS 2148135 5/1984 United Kingdom ............... 273/269

Primary Examiner—Jessica J. Harrison
Attorney, Agent, or Firm—Sixbey, Friedman, Leedom & Ferguson

[57] ABSTRACT

An automated casino gaming system includes a central game controller to which a number of automated writer stations are connected. In the keno playing embodiment disclosed, the automated writer stations each have a keypad with two colored LEDs mounted under each key. To play a game, patrons first insert a card into the automated writer station to identify their account maintained on the central game controller. The patron then enters a wager on the automated writer station. As the patron picks the desired numbers, LEDs of one color associated with the keys for the numbers will light. The patron presses a PLAY key to transmit an electronic "ticket" to the central game controller. When the period for entering wagers has ended, the central game controller requests a random draw from a separate, secure random number generator. The central game controller credits the accounts of winning players according to a preconfigured pay table before transmitting the results to the automated writer stations, where the draw is displayed on the keypad one number at a time using a second color of LED. The system can be configured with a cutoff level, with wins above the cutoff level being flagged for handpayment or for the automatic generation of tax forms. Cashier workstations connected to the central game controller implement a total cash management system which tracks all transactions and determines the amount of cash that should be at each cashier station.

49 Claims, 6 Drawing Sheets

SECURE AUTOMATED ELECTRONIC CASINO GAMING SYSTEM

MICROFICHE APPENDIX

The specification of this patent includes a microfiche appendix in the form of one microfiche having 31 frames. The microfiche includes Appendix A and Appendix B.

FIELD OF THE INVENTION

The present invention is a secure, centrally-controlled casino gaming system of the type having multiple betting stations. The exemplary embodiment disclosed is particularly directed to a keno-type casino game.

BACKGROUND OF THE INVENTION

Many state governments sponsor lotteries in which players choose a set of numbers and purchase a ticket containing these numbers. A daily or weekly drawing is then conducted using a mechanical device which randomly dispenses numbered balls, and players win money depending on the quantity of balls matching their ticket numbers. The tickets are purchased for a standard cash price at sales locations which may in some cases be connected to a central computer, and payments to winners are made in cash at these outlets or at a lottery office. Such lotteries are sometimes automated, using equipment such as that shown in U.S. Pat. Nos. 4,494,197 and 4,689,742 to Troy et al. and 4,323,770 to Dieulot et al. Such a lottery system will not perform satisfactorily in a casino, since profits will depend on the number of drawings that can be conducted in a given accounting period and the time required to print tickets, collect wagers, and make manual payments limits the speed at which games can be conducted. To maximize profits, drawings should be continual and the personnel needed for accepting wagers, paying out winnings, and securing the area should be minimized. In addition, slow-paced, fixed-wager drawings are less satisfying to players, who generally prefer faster-paced, more exciting games and who may wish to bet larger amounts in anticipation of a larger payoff. Therefore, in certain regions, keno parlors have been provided where such drawings are conducted at frequent intervals, such as every 5-10 minutes. Keno is a social game, rather than an individualized game of chance such as a slot machine. In keno parlors, players pick a desired group of numbers. Then, 15-20 numbers out of 80 possible are randomly selected, one at a time, in a central location in the parlor as players watch. All players compare their "picks" to the same set of chosen numbers. While freestanding automated keno games which draw numbers for a single player have been developed, these games do not provide the desired social aspects and group excitement of keno since players at individual machines are not affected by the same drawing.

Manual keno games are very popular, but are costly to operate since a large number of personnel are needed to accept bets before each draw, conduct the draw, and make payoffs after a draw. In a typical gaming jurisdiction, regulators will permit casinos to set odds for keno such that the casino's gross profit is about 28 cents of each dollar wagered. However, because of high personnel costs, the typical net profit for keno games is only a few cents for each dollar wagered.

Efforts have been made in the past to automate such keno games. U.S. Pat. Nos. 3,786,234 to Trent et al. and 4,033,588 to Watts show systems for expediting and automating customer transactions in a centrally-drawn keno game. U.S. Pat. No. 4,467,424 to Hedges et al. shows a remote gaming system with terminals which can be used to play keno and several other games after account ID data is entered. In one disclosed embodiment, a matrix of transparent conductors is mounted over a screen and the player touches the matrix at indicated points to place bets. The area touched is "blinked" to acknowledge an input. U.S. Pat. No. 4,875,164 to Monfort shows a processing system for a gambling game which stores game data on a card.

A number of systems have been developed which automate portions of other games of chance. U.S. Pat. No. 4,527,798 to Siekierski et al. shows a gaming system incorporating a random number generator which takes wagers on game outcomes and pays off winners. U.S. Pat. No. 4,322,612 to Lange shows a system for taking horse race wagers in which manually-completed tickets are scanned at a terminal. The wager data from the tickets is transmitted to a central processing unit which keeps track of bets and maintains a user credit balance. Other gaming systems in which a central computer services a number of terminals are shown in U.S. Pat. Nos. 3,810,627 and 3,909,002 to Levy, 4,283,709 to Lucero et al., 4,206,920 to Weatherford et al., 4,815,741 to Small, 4,775,937 to Bell, 4,636,951 to Harlick, 4,880,237 to Kishishita, 4,669,730, and 4,335,809 to Wain.

Systems have been developed which permit arcade games to be played on account. U.S. Pat. No. 4,575,622 to Pellegrini shows an electronic access control system for coin-operated games in which magnetic account cards are used to identify an account maintained on a central computer. The computer activates arcade games and deducts money from the appropriate account to pay for the game. Punched cards have been used for other purposes such as to activate hotel room door locks, as illustrated in U.S. Pat. No. 3,906,447 to Crafton.

Finally, certain techniques have been developed in an attempt to make gaming systems fail-safe or tamper-proof, although none of the prior art systems has been entirely satisfactory in this regard. Such systems are illustrated in U.S. Pat. Nos. 4,782,468 to Jones et al., 4,108,364 to Tanaka et al., 4,275,456 to Tanaka et al., and 4,727,544 to Brunner et al.

Prior systems have not achieved acceptance in the casino industry in large part because they do not offer adequate security and tracking functions. In addition, previous designs have incorporated expensive individual terminals. Because a large number of individual gaming terminals are needed in a full-scale casino operation, high per-terminal costs quickly multiply the total system installation and maintenance costs, so that the systems cannot be cost-justified. Thus, none of the previous systems have been satisfactory for use in a casino environment where reliability, simplicity of operation, and high levels of game security are required. Therefore, there is a need for a secure, reliable, low cost gaming system that conducts a series of exciting, fast-paced matching games, will meet regulatory requirements, and which also provides complete accounting and tracking information relative to the game.

SUMMARY OF THE INVENTION

Therefore, it is a general object of the present invention to provide an improved automated gaming system.

A further general object of the present invention is to provide an improved keno-type gaming system for use in a casino.

Another broad object of the present invention is to provide an electronic casino gaming system of low cost such that the cost can be justified by increased gaming revenues and reduced personnel requirements.

Yet another broad object of the present invention is to provide an electronic gaming system where critical files in a central computer are set up to indicate unauthorized tampering and where the critical files are checked for such unauthorized tampering at frequent intervals during gaming system operation.

It is another general object of the present invention to provide a complete automatic gaming system which performs automatically all necessary operational, accounting, and reporting functions associated with the game.

A more specific object of the present invention is to provide an automated gaming system which produces gaming results which cannot be manipulated without detection.

Another object of the present invention is to provide a terminal for an automated gaming system which permits entry of wagers and subsequently displays results of a game play.

It is also an object of the present invention to provide a terminal for an automated gaming system which uses a combined keypad and display board to receive a patron's picks in a game of chance, to display the picks, and to display the results of the game of chance.

A further object of the present invention is to provide a terminal for an automated gaming system which uses a combined keypad and display board to receive a patron's picks in a game of chance and display game results, wherein the display board has a number of visually distinct states which are used selectively to indicate picks, game results, and coincidence between picks and game results.

Another object of the present invention is to provide an integrated secure casino gaming system including a central game controller which conducts a game of chance, maintains player accounts, and processes wagers electronically.

A further object of the present invention is to provide an integrated secure casino gaming system with a central game controller that controls operation of a game of chance and maintains player accounts, and a number of automated writing stations at which patrons may place wagers on the outcome of the game of chance.

Another object of the present invention is to provide an integrated secure casino gaming system with a central game controller that controls operation of a game of chance and maintains player accounts, and a number of automated writing stations at which patrons may place wagers on the outcome of the game of chance, such that the automated writing stations permit patrons to edit their wagers locally prior to indicating that the wager should be entered, whereupon the wager is transmitted to the game controller and becomes irrevocable.

Yet another object of the present invention is to provide an integrated secure casino gaming system with a central game controller that controls operation of a game of chance and maintains player accounts, and a number of automated writing stations at which patrons may place wagers on the outcome of the game of chance, such that the automated writing stations permit patrons to edit their wagers locally prior to indicating that the wager should be entered, whereupon the wager is transmitted to the game controller and becomes irrevocable, and where the information on any desired wager entered through a writing station can later be reviewed at a game management terminal in case of a dispute.

Another object of the present invention is to provide an integrated secure casino gaming system with a central game controller that controls operation of a game of chance and increases and decreases the balances of player accounts depending on the results of wagers, and a number of automated writing stations at which patrons may place wagers on the outcome of the game of chance, such that the automated writing stations permit patrons to edit their wagers locally prior to indicating that the wager should be entered, whereupon the wager is transmitted to the game controller, such that the game is completed and operations on player account balances are finished prior to any display of results.

Another object of the present invention is to provide an integrated secure casino gaming system with a game controller that controls operation of a game of chance and increases and decreases the balances of player accounts depending on the results of wagers, which can be configured with a cutoff level, with payoffs below the cutoff level being credited to the account and with additional procedures performed for payoffs above the cutoff level to facilitate compliance with tax regulations.

A further object of the present invention is to provide an integrated secure casino gaming system with a central game controller that controls operation of a game of chance and maintains player accounts, which associates with critical files control words depending on the data contents of the critical files, and which checks the critical files at intervals to ensure that the control words are appropriate given the contents of the files, thus preventing unauthorized tampering with the critical files.

Another object of the present invention is to provide an integrated secure casino gaming system with a central game controller that controls operation of a game of chance and maintains player accounts, wherein modified checksums are associated with critical files and the validity of the checksums for such files is checked at intervals during system operation.

A further object of the present invention is to provide an integrated secure casino gaming system with a central game controller that controls operation of a game of chance and maintains player accounts using a double entry bookkeeping system.

Yet another object of the present invention is to provide an integrated secure casino gaming system with a central game controller that controls operation of a game of chance and maintains player accounts, wherein a double entry bookkeeping system is used to maintain player accounts such that the total of a group of accounts in the system is maintained at a constant value, with the group of accounts being totalled at intervals during operation of the system to detect any tampering with account data.

A further object of the present invention is to provide an integrated secure casino gaming system with a central game controller that controls operation of a game of chance and maintains at least two classes of player accounts, including promotional accounts and regular accounts.

It is also an object of the present invention to provide an integrated secure casino gaming system with a central game controller that controls operation of a game of chance and maintains at least two classes of player accounts, one having a predetermined starting value and one having a variable starting value determined by the patron at the time the account is opened.

Another object of the present invention is to provide an integrated secure casino gaming system with a central game controller that controls operation of a game of chance and maintains at least two classes of player accounts, with different amounts of information about the player being maintained in the different classes of accounts.

Another important object of the present invention is to provide an integrated secure casino gaming system with a central game controller that controls operation of a game of chance and maintains player accounts, including a cash management system for creating accounts and for changing the value of accounts in response to cash transaction data entered into a terminal associated with said central game controller means by an employee assigned to said terminal, said transaction data indicative of cash received or paid out of a cash storage means associated with said terminal, wherein said central game controller means is provided with the initial value of cash in the cash storage means and thereafter maintains, based on said transaction data, a calculated expected amount of cash remaining in said cash storage means, with said expected amount of cash being selectively displayable by system operating personnel.

These objects and others are achieved in one embodiment of the invention by providing an automated casino gaming system including a central game controller to which a number of automated writer stations are connected. In the keno playing embodiment disclosed, the automated writer stations each have an 85-key keypad with two colored LEDs mounted under each key. To participate in a keno game which is held open for a defined period, patrons first insert a card into the automated writer station to identify their account maintained on the central game controller, which may be a regular account or a promotional account. The patron may then enter a wager on the automated writer station. As the patron picks the desired numbers, LEDs of one color associated with the keys for the numbers will light. The patron may edit the proposed wager until satisfied, at which time the patron will press a PLAY key. This key irrevocably transmits information comprising an electronic "ticket" to the central game controller. The wager is entered only if the ticket information is successfully transmitted to the central game controller. When the period for entering wagers has ended, the central game controller requests a random draw from a separate, secure random number generator. The random number generator provides the random draw to the central game controller, and the central game controller credits the accounts of winning players according to a preconfigured pay table before transmitting the results to the automated writer stations, where the draw is displayed on the keypad one number at a time using a second color of LED. The system can also be configured with a cutoff level, with wins above the cutoff level being flagged for handpayment or for the automatic generation of W2-G forms as desired. Cashier workstations connected to the central game controller allow creation of accounts, adding money to accounts, and withdrawing money from accounts. The workstations implement a total cash management system which tracks all transactions and determines the amount of cash that should be at each cashier station.

The system is designed to provide a high level of security. System components accessible to the public are incapable of affecting the game results. Workstations require passwords and authorization to perform each function. Key system databases are provided with a modified checksum which is checked against the database prior to each game drawing to verify that databases have not been surreptitiously altered. The system uses a double-entry bookkeeping system, and account groups are summed prior to each game drawing to ensure that all accounts are in balance. All system transactions and wagers are logged to parallel redundant disk drives and to a hardcopy log printer. The system provides full report generation features, organizing information about transactions and system incidents in a concise manner to enhance management control.

DETAILED DESCRIPTION OF THE PREFERRED EMBODIMENTS

The present invention is a centrally-controlled casino gaming system of the type having multiple betting stations. While the inventive aspects of this system will be disclosed in the context of a keno-type game, the concepts disclosed can be readily applied to any casino gaming system.

Figure 1:
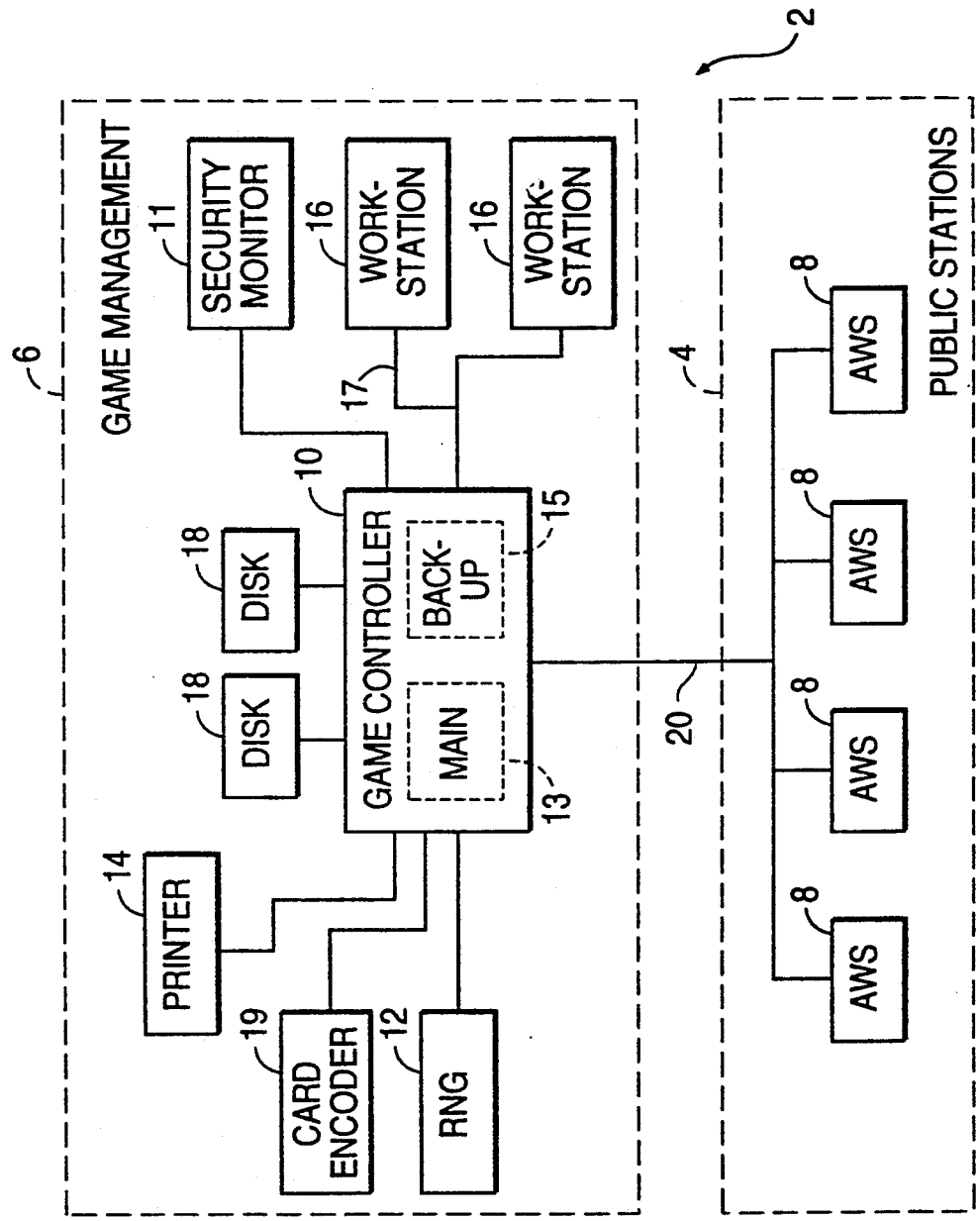
FIG. 1 is a block-schematic diagram of the game system of the present invention.

Referring first to FIG. 1, the gaming system of the present invention is shown generally at 2. The system 2 has two major parts: public stations 4 and game management section 6. The public stations 4 are publicly visible and accessible to gaming patrons and comprise a plurality of Automated Writer Stations 8 (AWSs). The game management section 6 provides the administrative management capacity required to make the game secure, accountable, and reliable. The functions of game management section 6 include employee, cash, and activity tracking as well as actual game operation functions. Game management section 6 is constructed around a Game Controller 10 (GC) which is a computer having one or more processors, input and output ports, ROM and RAM memories, and having associated with it, although not shown in FIG. 1, other typical computer peripheral devices such as a keyboard, pointing device, display screens, mass storage, etc. The game management section 6 further comprises a Random Number Generator (RNG) 12, a printer 14, a security monitor station 11, one or more workstations 16 connected by token ring network 17, a card encoder 19, and at least two hard disks 18, all of which are connected to GC 10. The AWSs 8 are connected to the GC 10 using fiber optic network 20.

Figure 2:
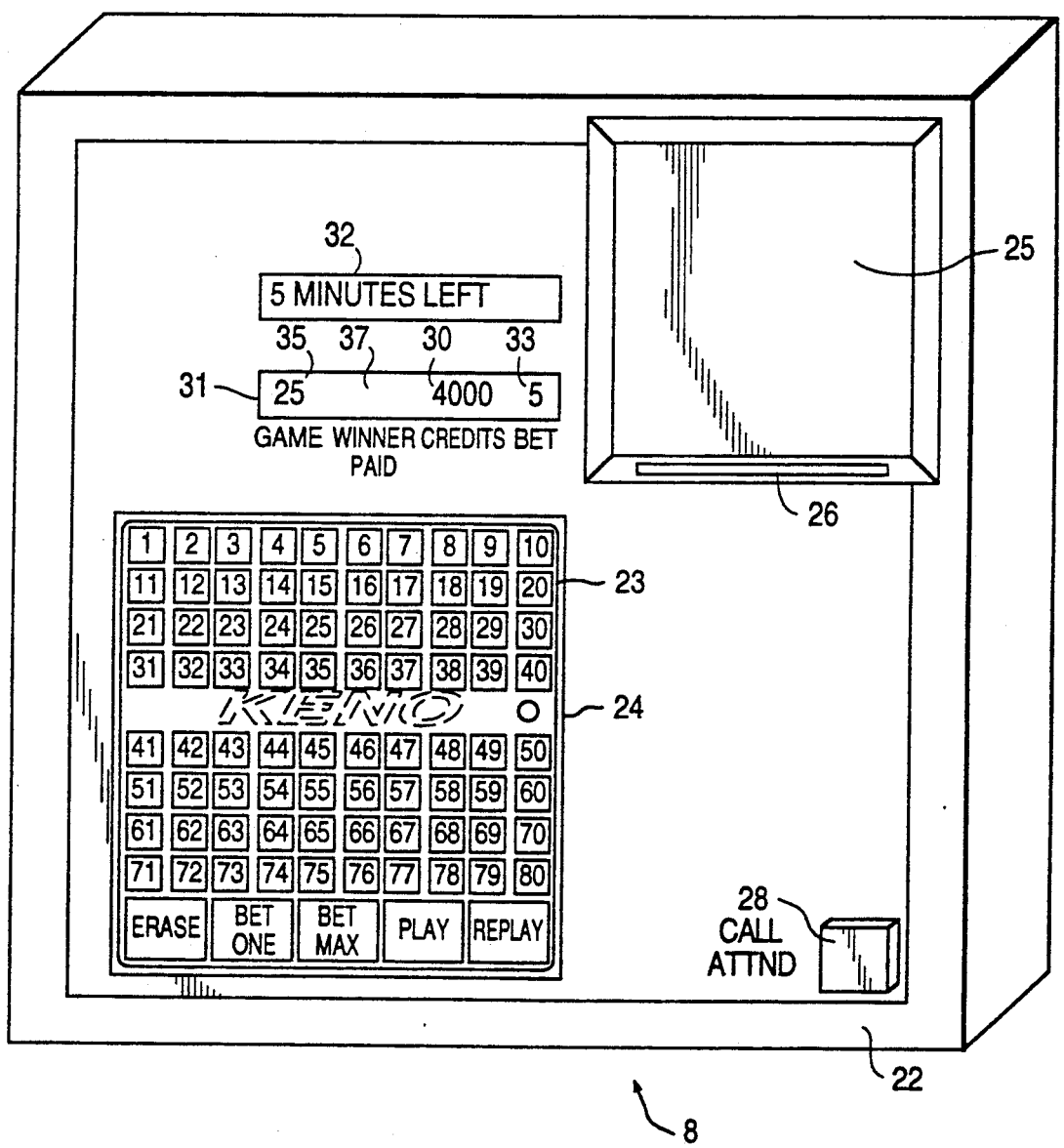
FIG. 2 is a top view of an automated writer station of the present invention.

The AWSs 8 will be described in detail with reference first to FIG. 2. A single AWS 8 is shown in FIG. 2, although there will normally be a large number of AWSs 8 in a system 2. The AWSs 8 may be identical, although it will often be desirable to provide more than one model of AWS 8 attached to a single system 2. For example, the present invention could employ AWS 8 models which are floor standing models, table- or bar-top models, chair-attached models, single user models, multiple user models, models with different color casings which may have different betting amounts associated herewith, and many other possible variations on the basic AWS 8.

As shown in FIG. 2, a preferred AWS 8 is constructed in a secure housing 22. Installed in housing 22 are keypad 24, display board 23 associated with keypad 24, card reader 25 having card slot 26, attendant call button 28, status display 31 comprising account balance display 30, bet display 33, game display 35 and payoff display 37. AWS 8 also includes a separate message display 32. The call attendant button 28, when pressed by the gaming patron, will transmit a signal to game controller 10 which will provide an audio and/or visual signal to casino personnel indicating that assistance is required and identifying the AWS 8 where assistance is required. The call attendant button 28 may be provided with an indicator light (not shown) which will be activated by AWS 8 when the call attendant button 28 is pressed.

The keypad 24 is a membrane-type keypad with an array of keys labeled 1-80, keys labeled ERASE, BET ONE, BET MAX, PLAY, and REPLAY. Keypad 24 may also include an appropriate keypad interface device which scans the rows and columns of the keypad 24 to determine when a key has been pressed. This function may also be performed by the processor 34. Such keypads are manufactured to order by many companies according to well-known principles to meet the particular sizing, arrangement, and labeling requirements of the design. Mechanical switch keypads or capacitive touch pads having no moving parts could also be used.

The preferred labelling and arrangement of the keypad 24 is shown in detail in FIG. 2. However, FIG. 2 has not been rendered in actual size. It will generally be desirable to construct the keypad 24 such that each numbered key can be pressed by the majority of human fingers without accidentally pressing an adjacent key. Thus, the actual keypad used should be larger than the keypad shown in FIG. 2. It is also important that the keypad 24 be designed in conjunction with the display board 23 so that the keys of keypad 24 will align in proper registration with the associated indicators of display board 23. Additional keys in keypad 24 may be provided for selecting other desired functions. Also, while the preferred embodiment includes keys labeled 1-80, there may be a larger or smaller number of keys for a non-standard keno type game, depending on the number of possible "ball identifications" programmed into game controller 10, since the keys will correspond to the "balls" which may be drawn. Also, an identification scheme for the keys other than the preferred standard numeral system may be used, such as playing card identifications (ace of hearts, two of hearts, etc.), roman or other numerals, types of animals, kanji characters, cities of the world, or any other desired designation. What is important is that the identification scheme selected provide a unique identification for each key, and thus each "ball" which might be drawn.

Figure 3:
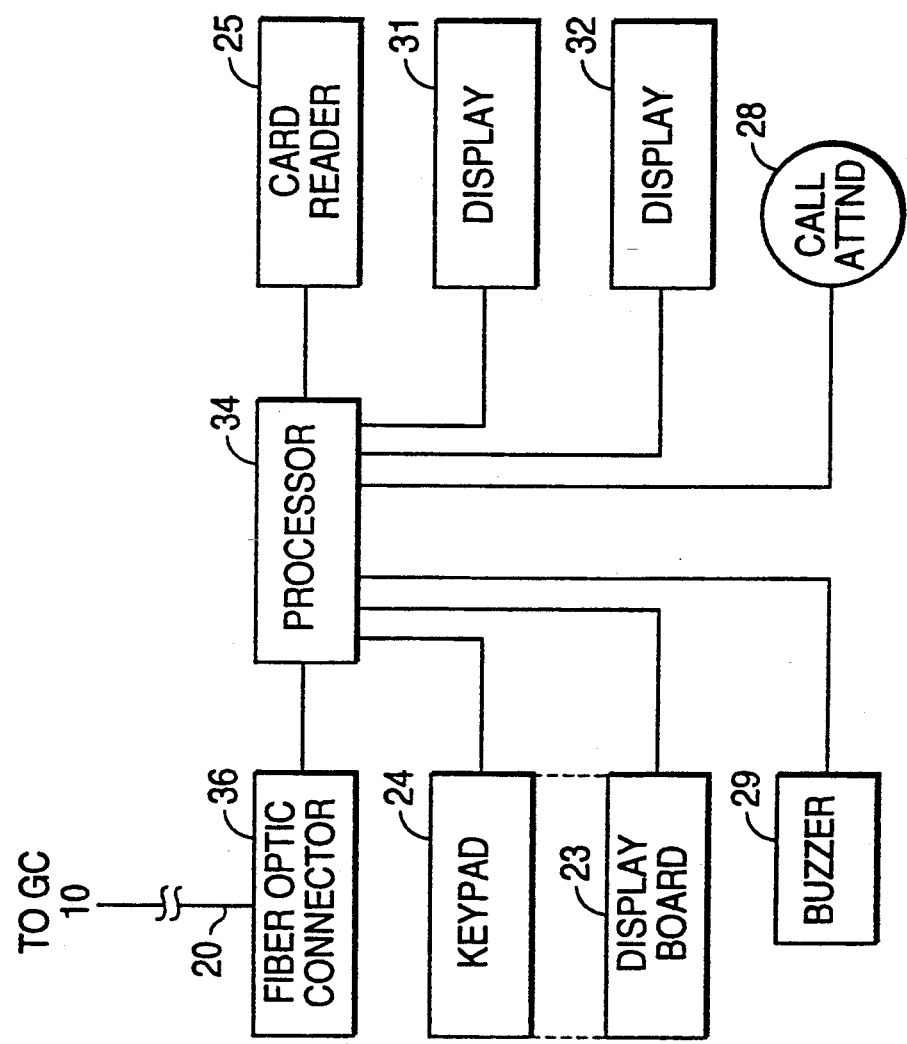
FIG. 3 is a block-schematic diagram of the automated writer station of FIG. 2.

The AWS 8 includes one or more internal circuit boards (not shown) which hold functional components and which, together with the other elements of AWS 8, form an operating circuit of AWS 8. FIG. 3 shows the AWS 8 circuit in block form. This circuit includes a processor 34, which may be a single integrated processing device or may be constructed using multiple integrated devices. Processor 34 will include a microprocessor, RAM, ROM, timers, and input and output ports. The ROM associated with processor 34 will hold a program which implements the operations and functional features described herein, and which will be described later in more detail with reference to Appendix A, contained in the microfiche appendix to the specification. Connected to appropriate ports associated with the processor 34 are card reader 25, display 31, display 32, call attendant button 28, display board 23 and the associated keypad 24, buzzer 29, and fiber optic connector 36. Fiber optic connector 36 is an interface between processor 34 and the fiber optic network 20 which connects AWS 8 to game controller 10. Each AWS 8 has a unique address on fiber optic network 20, so that the game controller 10 can provide message and other information to individual AWSs 8 as required. Buzzer 29 is a sound-producing device which provides desired audio feedback to the patron operating the AWS 8. Among other uses, the buzzer 29 may be used to indicate error conditions, indicate inappropriate keypresses on keypad 24, indicate that a prize has been won, or to provide audio feedback upon processing of either all keypresses or designated keypresses on keypad 24. In particular, the buzzer 29 may beep when the PLAY key is pressed to enter a wager into the system 2 in a manner which will be explained later in more detail.

The card slot 26 of card reader 25 accepts a card (not shown) coded to identify an account maintained in the files of game controller 10, which is associated with a particular individual and has an account balance. The card reader 25 disclosed herein is a means for entering an account code number. Various types of card readers 25 can be provided which will perform this function, and the selection of the card reader 25 will depend on the type of card desired. Punched (Hollerith) plastic cards are preferred for their durability, although other types of cards such as magnetically coded cards or field-responsive cards can also be used. The cards used will be encoded by card encoder 19 which is controlled in response to a program running on a workstation 16. In another embodiment, firmware is provided in the AWS 8 which allows a patron to enter his or her account number, and a personal identification number (password) if desired, into the AWS 8 using the keypad 24, thus providing a means for entering the account number which does not require carrying a physical instrumentality such as a card. However, while this embodiment has certain advantages and is within the spirit of the present invention, it is less preferred because it requires the patron to assume responsibility for knowing and safeguarding the account number and personal identification number.

Displays 31 and 32 are preferably 16-character alphanumeric vacuum-fluorescent displays. Status display 31 includes account balance display 30, which displays the balance in an account associated with the card inserted in card slot 26. This balance can be provided in dollars and cents or in "credits" which are the units accepted for bets and which will have a monetary value programmed into game controller 10. For example, the account associated with the card inserted in card reader 25 might have a balance of $1,000. If game controller 10 has been programmed to accept bets in increments of 25 cents, the account balance could be converted for display purposes to 4,000 credits (each having a 25-cent value). Game number display 35 of status display 31 displays a game number that is incremented each time game controller 10 draws a new set of numbers. The bet display 33 of status display 31 indicates the amount bet by the player, which is determined by monitoring the BET ONE and BET MAX keys in a manner which will be described later. The payoff display 37 of display 31 shows the number of credits won by the player in a game. Message display 32 displays desired messages from the game controller 10, such as time remaining to make a bet before a drawing occurs, advertising messages such as "PLAY INSTANT KENO (TM)", and messages to the player such as "YOU'RE A BIG WINNER!!!" The displays may be scrolled if messages which are longer than 16 characters are to be displayed.

Many display technologies might be used to create message display 32 and status display 31, such as LEDs, LCDs, and display mechanisms which have been used in laptop and desktop computers such as LCDs, gas plasma screens, video display tubes, etc. The two displays 32 and 31 are shown as separate, but could be accomplished in different areas of a single screen display device if desired. The status display 31 and message display 32 devices chosen should be durable, relatively inexpensive, and capable of displaying at least the character set made necessary by the contents of any messages which are to be displayed by them. Vacuum fluorescent displays are preferred for their visibility, durability, and low cost. However, the other known technologies might also be used within the spirit of the present invention.

The housing of AWS 8 may be provided with appropriate decoration, such as decals, screened designs, lights, lighted panels, cup holders, ashtrays, etc. In addition, AWS 8 may be provided with auxiliary indicating devices in addition to buzzer 29 which may be actuated when a player wins at least a preset amount or matches a minimum number of balls. Appropriate win indicating devices might include auxiliary lights such as strobes or rotating beacons and other sound producing devices such as bells, sirens, electronic sound speakers, and voice synthesizers.

Figure 4:
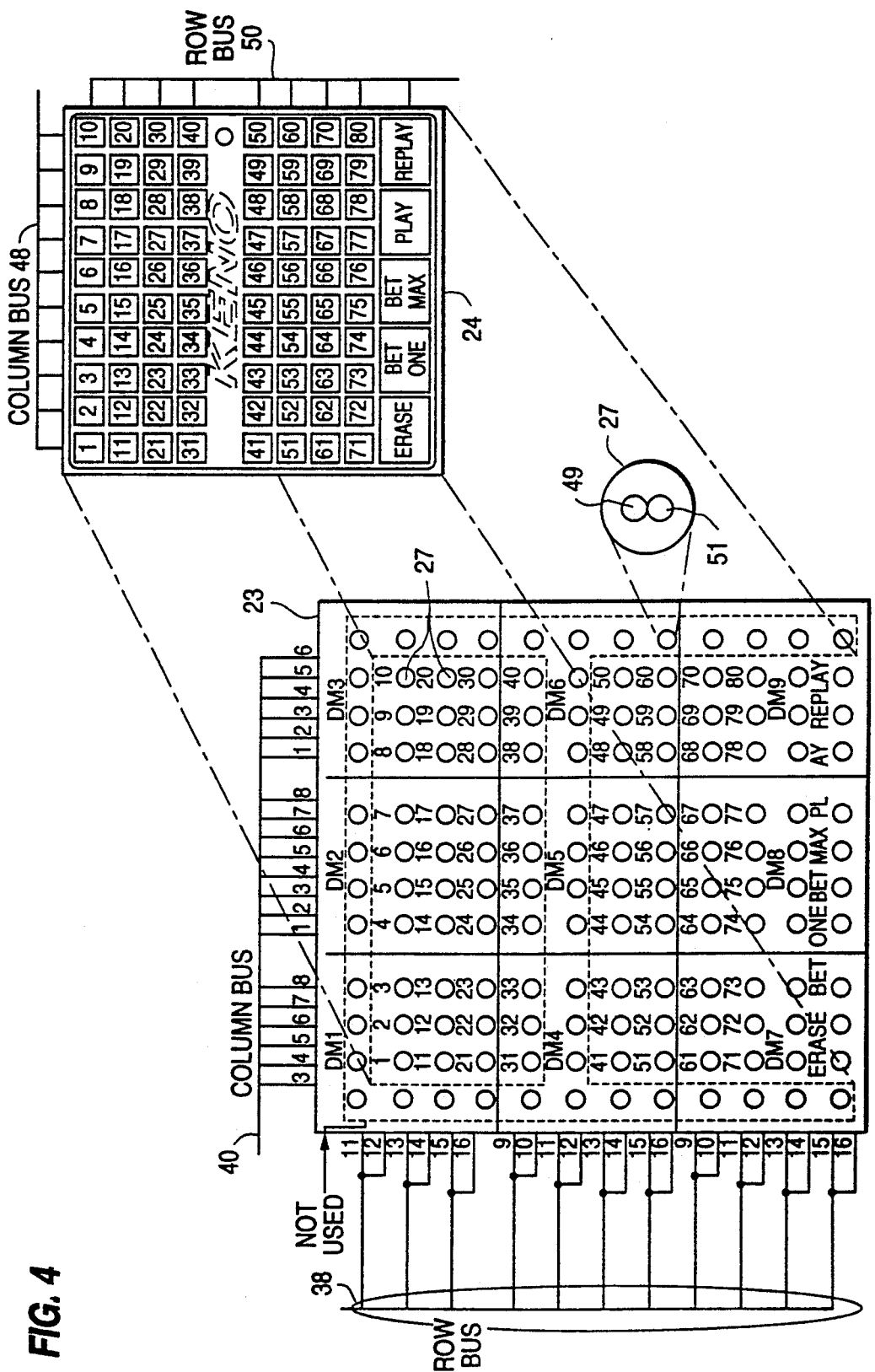
FIG. 4 is a diagram showing the assembly of the combination keypad and display of the automated writer station of the present invention.

Referring now to FIG. 4, the construction of display board 23 and the registration of display board 23 with the keys of keypad 24 is shown in detail. Display board 23 is an array of indicating devices associated with the keys of the keypad 24. In the preferred embodiment shown in FIG. 4, two light emitting diodes 49 and 51 (one orange, one green) will be provided to make up a tricolored LED 27 below each key on the keypad 24. These groups of light emitting diodes will be referred to as tricolored LEDs, since they are capable of displaying three colors corresponding to the possible activated permutations of the two colors of LEDs. The display board 23 is made up of a plurality of tricolored LEDs 27 arranged in registration with the keys of keypad 24 as shown in FIG. 4. One appropriate tricolored LED 27 assembly is part number LTP2044A3 sold by Lite-On of Milpitas, Calif. This part includes 16 tricolored LED elements 27 in a 4×4 array, and a plurality of these arrays, such as the nine shown in the illustration and labeled DM1 through DM9, can be combined to form the display board 23 as shown in FIG. 4. Each user-actuated button on keypad 24 should be associated with an illuminatable display or displays for thus identifying information to be entered through the user actuated element or for identifying information which has been added. Display board 23 has a row bus 38 and a column bus 40 each including lines from the indicated row and column pin numbers of the tricolored LED 27 assemblies DM1-DM9. The lines forming row bus 38 and column bus 40 will be connected to input/output ports of processor 34, so that each of the two LEDs forming each tricolored LED 27 can be selectively activated on an individual basis by processor 34 in response to its internal program and in response to indications received from game controller 10. Some tricolored LEDs 27 are not needed since the assemblies DM1-DM9 provide more tricolored LEDs 27 than there are keys in keypad 24. Therefore, some of the tricolored LEDs 27, which are indicated by the notation "NOT USED" in the drawing figure, need not be connected to the processor 34. The keypad 24 has column lines terminating in a column bus 48 and row lines terminating in a row bus 50. The row and column lines form a matrix which can be scanned to determine whether a key is being pressed in a manner which is well-known in the art. The lines forming column bus 48 and row bus 50 will be connected to processor 34, either directly or via an added keypad scanning circuit (not shown) as described previously.

As can be seen in FIG. 4, the keypad 24 is mounted in registration with the display board 23 so that each of the 85 keys of keypad 24 is associated with one or more of the tricolored LED elements 27 of display board 23. The keypad 24 and display board 23 will be mounted in the housing 22 of AWS 8 in this aligned arrangement. At least portions and perhaps all of the keypad 24 will be made translucent so that the LEDs of display board 23 will shine through the keypad 24 when activated. In one preferred embodiment, the keys are generally opaque, but have the portions where the labelling letters exist formed of translucent material, so that when the LEDs of display board 23 are activated, the label such as "47" or "PLAY" on a key associated with an activated LED will appear to glow with the color of the LED activated. If mechanical switch keypads or touch pads having no moving parts are used, indicating devices such as the LEDs described could be placed either under translucent key areas or next to opaque key areas in such pads, so long as the indicators are visually associated with the keys.

Thus, each key in keypad 24, and particularly the numbered keys, can be lighted from beneath in one of four states: off, a first color (such as green in the embodiment shown) a second color (such as orange in the embodiment shown) and a third color formed from the combination of the first two colors. In addition, multiple additional display states can be generated by operating one or more of the LEDs in tricolored LEDs 27 at a partial duty cycle to generate a flashing effect. A single color may be flashed on and off, or an alternating flashing effect may be created by periodically switching one LED off and switching the other LED on at about the same time. If more LEDs are provided for each key, a larger number of possible indication states can be generated. With the system disclosed, the processor 34 can provide a large number of status indications related to the keys of keypad 24 and the numbers with which the keys are labelled. As will be seen, the processor 34 will provide one of the possible indications described to indicate "picks", or keys pressed by the patron. A second type of indication will be used to indicate balls chosen in the draw conducted by the central game controller 10 and RNG 12. A third type of indication among those possible will be used to indicate coincidence between the set of picks and the set of chosen numbers.

The combination of a data entry device (keypad 24) and a display device (display board 23) in this manner provides numerous advantages. The patron is given immediate visual feedback as to keys pressed during a period when numbers are being selected for a wager. The patron can see at a glance whether a keypress was processed by processor 34, can see how many numbers of the 80 possible have been selected, and can see which ones of the 80 possible numbers have been selected. In addition, since the processor 34 can display numbers drawn in the game, as they are drawn, on the display board 23, the patron can visually observe the progress of the game and the results without the need to provide additional, central game results displays within viewing distance of each AWS 8. Finally, the use of different display modes within the same display board 23 permits the simultaneous display of picks and draws on the same board, so that the picks and draws can be readily compared by the patron. The availability of plural display modes allows coincidences between picks and draws to be highlighted, further enhancing the ability of the patron to determine his or her winnings. Thus, the device disclosed combines a data entry keyboard, keyboard feedback device, pick indicator, draw indicator, and win indicator in an inexpensive, reliable design.

Although larger and more expensive displays (such as those previously described as alternatives to the preferred embodiment) could be used to obtain these same advantages, the use of LED displays in the manner shown provides all of these advantages and functions at low cost. The reliability, longevity, and resistance to abuse of LEDs is also greater than that of video tubes, LCD displays, touch screens, etc. so that the preferred embodiment disclosed will also require less maintenance and repair than other technologies.

Figure 5:
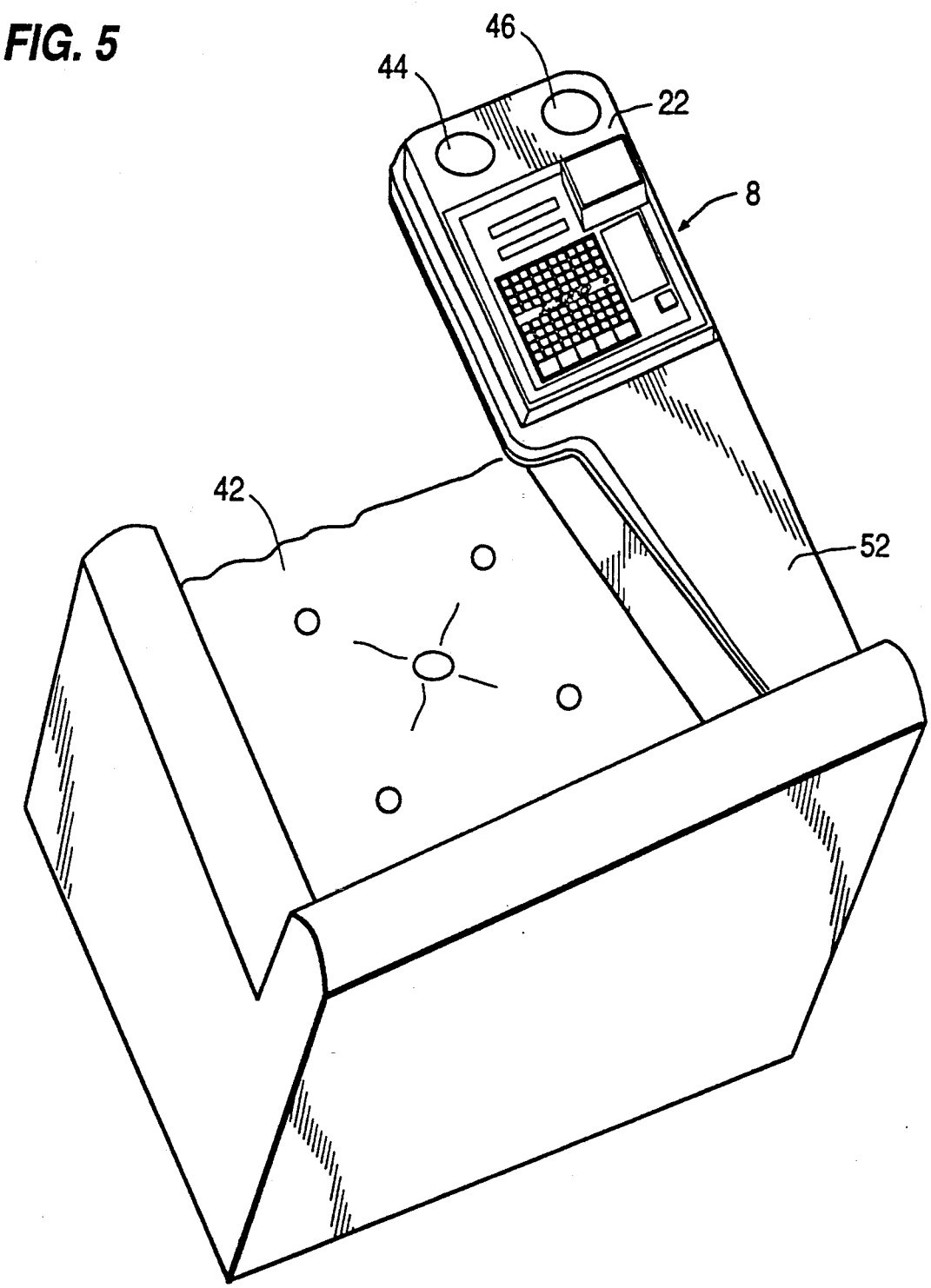
FIG. 5 is a perspective assembly drawing showing an embodiment of the present invention in which an automated writer station is constructed integrally with a chair.

Referring now to FIG. 5, in another preferred embodiment, the AWS 8 may be mounted on or constructed integrally with a cushioned keno chair 42 having an arm 52. The housing 22 of AWS 8 is provided with cupholder 44 and ashtray 46 for the patron's convenience. A large number of keno chairs 42, each including an AWS 8, will generally be arranged in a parlor-like atmosphere to enhance the social aspects of the game. The AWS 8 will be positioned ergonomically on the arm 52 of chair 42 so that the keypad 24 will be in proper operational position and so that the displays associated with AWS 8 can be viewed by a typical user relaxing in the chair 42 and having his or her elbow resting naturally on the arm 52 of chair 42. Both right-handed and left-handed chairs may be provided if desired.

The general operation of AWS 8 will now be described with reference again to FIGS. 2 and 3. The players enter their picks and bets by pressing numbers on the keypad 24 of AWS 8 during a defined playing time. The player then presses the PLAY key to send information comprising an electronic "ticket" to the central game controller 10. This information is preferably maintained in electronic form throughout the course of the game, so that no paper tickets are printed and distributed to the customer, although a receipt printer could be associated with the AWS 8 if desired. The electronic ticket information includes information identifying the account from which the bet is drawn, the amount of the bet, and the numbers which have been selected. Ticket transmissions are accepted by the game controller 10 during a defined time, after which no further tickets are accepted by game controller 10 and game controller 10 conducts a drawing. Patrons who have selected numbers matching at least a defined quantity of the numbers drawn by game controller 10 win cash or other prizes. At the close of the game, the game controller 10 obtains the draw from the RNG 12 and calculates the winner results. The GC 10 then updates the accounts of winners accordingly. After all accounts have been updated, the GC 10 displays the draw, one "ball" or number at a time, using a preprogrammed time delay on all AWSs 8 having an account card inserted, thus constituting a delayed display of each randomly selected number. The sequential draw display makes the game more exciting and longer lasting by thus simulating the operation of a "squirrel cage" manual drawing. The GC 10 determines the winners and displays the results on AWSs 8.

More specifically, in a typical scenario, the operation of AWS 8 will begin when a patron buys an account card which is associated with an established account in the game controller 10 and has an account balance associated with it. Two types of accounts are provided in the system 2: regular accounts which are associated with a particular patron who regularly frequents the establishment where system 2 is installed, and promotional accounts which have a pre-established standard beginning account balance. Promotional account cards may be provided at a discount in bulk to tour operators or groups visiting the casino where system 2 is installed, and promotional accounts may therefore be established for an individual without knowing that individual's name, social security number, etc.

The patron, having obtained a card associated either with a regular account or a promotional account, inserts the card into the card slot 26 of card reader 25 on the AWS 8 to initiate play. The AWS 8 reads the account number from the card, sends an embedded security number to the GC 10 to determine that the account is valid, and then displays the account balance associated with the account number to the player using account balance display 30. The AWS 8 also displays in game display 35 of status display 31 the game number of the present game, and in message display 32 the remaining time the current game will be open, which will be referred to as the countdown.

The patron selects his or her number "picks" by pressing the desired numbers on the keypad/display 24 of AWS 8. An LED of a first color, such as green, will light under the keys pressed to indicate the selection of that number. The player then presses the BET or BET MAX keys of keypad 24 to bet the amount desired. Each press of the BET key will increment the number of credits bet, up to the maximum number allowable for the AWS 8. Pressing the BET MAX key will set the number of credits bet to the maximum allowable in a single keystroke. The number of credits bet is shown in bet display 33. The ERASE key cancels all picks and the amount bet if it is pressed prior to pressing of the PLAY button. Pressing the PLAY button will cause AWS 8 to transmit the electronic "ticket" consisting of the numbers picked, the amount bet, and the account number to game controller 10. Once the PLAY button has been pressed and the ticket has been transmitted, the bet is entered in the system 2 and the amount of the bet is deducted from the player account. Pressing ERASE at this point will not revoke the bet. Thus, the ERASE key and the operating software implementing the functions of this key provide means for modifying a wager prior to transmitting the wager to the central game controller 10. The wager modification means does not allow modification of the wager after an indication that the bet is complete is entered and the wager ticket information is transmitted to the central game controller 10. Other means for modifying a wager prior to transmission could also be provided. In the simplest embodiment, removal of the card from card reader 25 prior to pressing the PLAY key would erase the wager and prevent it from being entered. The card could then be reinserted in card reader 25 and a corrected wager entered.

The player may choose to play the same numbers and bet for the next game by pressing the REPLAY key. If the REPLAY key is held down for a second, the AWS 8 will prompt the player to enter the number of games for which the same numbers and bet are to be repeated. The account balance in game controller 10 and the account balance display 30 are then updated to reflect the total amount bet for all games. The player withdraws the card from the AWS 8 to stop playing. Withdrawing the card prior to pressing the PLAY or REPLAY key will terminate he game play. A "ticket" which has been sent to the computer by pressing PLAY will be continued even if the card is removed prior to completion of the game. When the card has been removed, game results will be posted to the player account, but not displayed on the AWS 8 used to place the bet. However, if the player selected multiple replays, the subsequent replays are canceled if the card is removed. The player may take his card to a cashier location having associated with it a workstation 16 of game management section 6 to withdraw his or her account balance, or the player may leave the balance on account for future play.

An electronic "ticket" for each individual player is created upon an acknowledged depression of the PLAY or REPLAY keys. Once the Game Controller 10 has received the "ticket" and sent acknowledgement back to the AWS 8, the "ticket" is valid, is recorded on an audit log maintained by game controller 10 using hard disks 18 and printer 14, and will be recoverable by recovery procedures should an AWS 8 or the game controller 10 fail. If the Game Controller 10 does not receive the electronic information and activate the "ticket," the system will not process the wager, and the amount of the wager will not be deducted from the player's account.

The patron will be able to select desired number picks during the term of the countdown. When the picks and bet have been chosen, the player presses the PLAY key to send the electronic "ticket" information to the game controller 10 through fiber optic network 20. The account balance display 30 will then show the account balance, with the amount just bet subtracted. When the countdown expires, the game controller 10 closes the game and obtains the game draw from random number generator 12. As will be explained in detail later, the game controller 10 does this by sending a signal to RNG 12 requesting a draw of 20 numbers out of the possible 80 ball designations. The game draw is received from the RNG 12, and the results are calculated for each player by game controller 10 and the player accounts are updated accordingly. Thus, before any results are displayed to the players, the results have already been posted to player accounts. Should one of the computers "crash" during posting of the results and updating of player accounts, the players will never see the results. Thus, players will not be informed that they have won, and become upset when a computer crash immediately after the draw but before posting of the results makes it necessary to cancel the game drawing and restart the system, thus negating the win. Results are transmitted to the AWSs 8 and displayed one number (or "ball") at a time on each AWS 8 in the manner described previously using LEDs associated with the appropriate numbered keys of keypad/display 24. The LEDs used for game results will be of a different color than the color used for the picks. For example, orange might be used for the game results, while green was used for the picks. It will be desirable to highlight coincidences between the picks and draws. The AWS 8 may highlight these coincidences by flashing the LEDs associated with numbers both picked and drawn alternately between green and orange. When the game draw has been displayed, each AWS 8 then receives and displays the player's individual results. All results are calculated, and account balances are maintained and updated, by the game controller 10 as will be described in more detail later. The new account balance with any amount won added is displayed by the account balance display 30. A new game number is displayed by game number display 35 of status display 31 and the game sequence starts over.

In general, when a player wins, his or her account balance will be automatically updated by game controller 10. However, certain large payoffs above a limit configured in game controller 10 will trigger an alert to gaming system management personnel. The game controller 10 will inform the manager of the amount of the win and the account number of the individual, and the manager will pay the winner by hand. The ability to set a level below which winnings will be automatically credited to the patron's account and above which a manager must be involved in the payoff increases the security of the system and also ensures compliance with federal tax regulations which require that certain information be recorded and certain forms generated in case of large gambling winnings. At the present time, a federal W2-G tax reporting form must be provided to any player winning more than $1,500, so this level will normally be selected at the cutoff above which winnings must be paid manually rather than on account. However, any other desired cutoff might also be selected. Thus, this feature is a substantial advantage in the design of the system 2.

Instead of requiring a hand payment, the system may also be configured to credit an account with a substantial win and to then flag accounts which were credited with wins greater than the cutoff level. When the patron "cashes out" the account or performs another transaction at a cashier station associated with game management section 6, the workstation 16 used by the cashier will provide an indication that the account has been flagged and that the necessary tax paperwork must therefore be completed before cashing out the account. It may be desirable to treat different types of accounts in different ways. For example, a regular account belonging to a regular patron whose home address and social security number are known to the casino might have his wins credited to the account directly. The game controller 10 could be programmed to automatically generate the necessary W2-Gs and address them for mailing to the regular patron's home at the end of the year or at other convenient intervals. A promotional account player, on the other hand, might be required to accept a hand payment from a manager so that necessary tax information can be collected since the casino may not have the information needed to comply with tax laws at the time of the win.

Each AWS 8 is designed to recover its prior status should any electrical malfunctions or static discharges disturb normal operation. In these cases, AWS 8 automatically resets on power up and then requests a reload of the information on the display when the malfunction occurred. If a ticket had been "vended" prior to the malfunction, the AWS 8 will display the results of the game that the ticket was vended for.

As noted previously, the functions of AWS 8 described herein are implemented in software stored in a nonvolatile memory accessible by processor 34. Flowcharts for the software of AWS 8 are shown in Appendix A, contained in the microfiche appendix to the specification. In general, on powerup of AWS 8, the INIT-.ASM routine will be executed. This routine initializes registers and tests the random access memories of AWS 8 before transferring execution to the main program. The main program, designated MAINLINE, is a continuous loop in which the various input and output devices connected to AWS 8 are serviced. MAINLINE checks registers associated with each device and, when the registers have data for processing, MAINLINE processes the data. The devices serviced include the keypad 24, serial messages (data received from game controller 10 through fiber optic network 20 and fiber optic connector 36), the card reader 25, the displays 31 and 32, and the LEDs of display board 23. The processor 34 of AWS 8 is provided with a timer which periodically, at intervals of a fraction of a second, generates an interrupt causing the execution of the TIMER INTERRUPT routine. This routine first services timing registers used for other AWS 8 functions, then scans keypad 24 for keypresses, setting a flag if a key has been pressed. The routine refreshes the display of display board 23, scans the call attendant button 28 to determine if it has been pressed and turns on a lamp associated with call attendant button 28 if the button was pressed.

The insertion or removal of a card in card reader 25 will generate an interrupt to cause execution of the CARD STROBE INTERRUPT routine which sets a card status flag. The presence of serial data at fiber optic connector 36 will generate an interrupt causing execution of the SERIAL INTERRUPT routine. This routine stores received data in a receive buffer and sets a message ready flag.

The CARDREAD routine is executed periodically as part of the MAINLINE continuous loop. When a change in card status has been noted as a result of a CARD STROBE INTERRUPT routine execution, the CARDREAD routine will read in and validate new card data or will clear card data from memory if the card has been removed. The CRC routine is used to check the validity of a card as part of the CARDREAD routine.

Similarly, the DRAW_SERVICE routine is executed periodically as part of the serial message service of the MAINLINE loop. If a draw has been performed by game controller 10 and a card is inserted in AWS 8 and a valid ticket was "vended" by AWS 8 for the draw, the DRAW_SERVICE routine will display the draw using display board 23.

The displays 31 and 32 are serviced in the MAINLINE loop by transmitting to the displays 31 and 32 message data which has been received through operation of the SERIAL INTERRUPT routine. While particular messages might be transmitted in their entirety from game controller 10 when they are to be displayed on displays 31 and 32, the embodiment shown in the flowcharts permits messages to be transmitted in frames prior to the need to display the messages on displays 31 and 32. The messages can then be displayed in a predetermined manner depending on the status of the AWS 8. For example, when there is no account card in AWS 8, the display 32 may be serviced by providing an "attract" message sequence which may include several message frames to be displayed sequentially. The set of message frames which may be displayed are downloaded to AWS 8 by game controller 10 in response to a request from AWS 8 generated on powerup. Message frames may include both alphanumeric message data and instructions for displaying the data, such as instructions to flash or scroll the data. When it is necessary that a particular message be displayed by AWS 8, such as for example "YOU'RE A BIG WINNER!", a message sequence instruction will be transmitted from game controller 10 and will be serviced by AWS 8. The message sequence instruction will include information on the desired frame display duration, a repeat flag, a blank when done flag, a 'keep last frame displayed' flag, and a message frame number identifying the frame number to be displayed. Message frames may be stored in AWS 8 in sequence lists containing up to 16 message frames. A message sequence instruction may identify a previously transmitted sequence list for display.

Data bytes maintained by processor 34 track game status and game mode according to the chart provided in Appendix A, contained in the microfiche appendix to the specification. A status byte provides status flags which reflect the status of AWS 8 as shown.

The keypad 23 is serviced by MAINLINE whenever an account card is present and the flag indicating a keypress is set. If a numbered key has been pressed and the countdown for a current game has not expired, a flag will be set indicating that the particular numbered key has been picked by the patron. This flag will subsequently be used to identify the picks to be transmitted as part of a wager "ticket" and to determine which LEDs should be lit in display board 23. If one of the five functional keys has been pressed, the appropriate function will be performed. For example, when the PLAY key is pressed, the AWS 8 will transmit data defining an electronic "ticket" to the game controller 10 as described previously.

Although the general operation of game management section 6 has been described as a necessary adjunct to a description of the AWS 8, the operation of game management section 6 will now be described in detail. The operation of game management section 6 is controlled by game controller 10, which is the central processing station for the game management section 6. Game controller 10 is a computer or computers, compatible with an IBM personal computer and operating using Microsoft's DOS, which operate using a program constructed according to the functions described herein.

Figure 6:
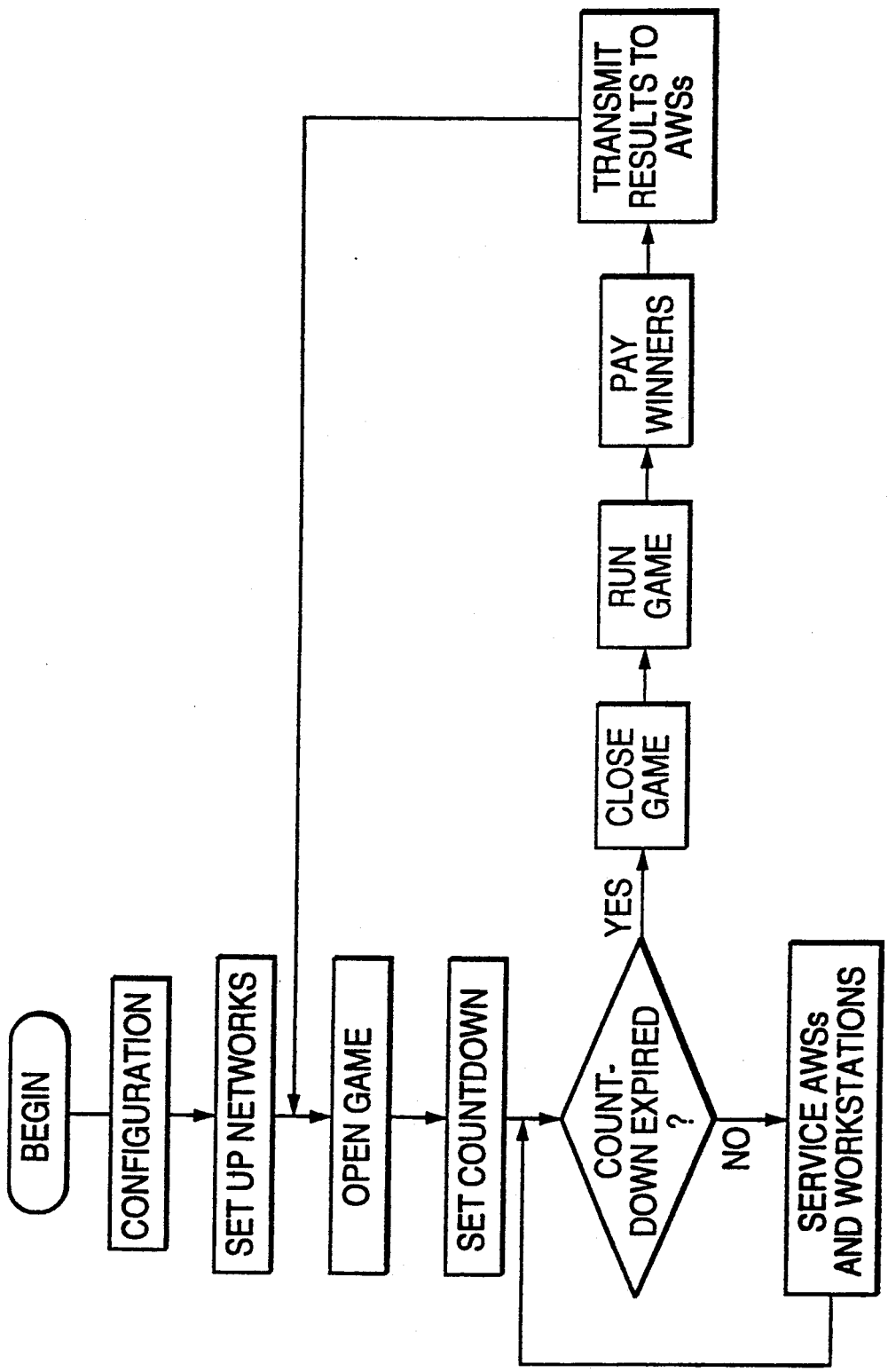
FIG. 6 is a software flowchart showing the main program operating sequence of the game controller of the present invention.

FIG. 6 is a flowchart showing the general operation of game controller 10. The operation begins with initial configuration of the system, which will be described in detail later. The game controller 10 then sets up the networks supported by game controller 10, including fiber optic network 20 and token ring network 17. Network setup includes identification and initiation of communications with authorized stations on the respective networks, and in the case of the fiber optic network 20, downloading of message and status information to AWSs 8.

The game controller 10 then opens the game for operation. The countdown timer is set for the configured game duration. During the period before the countdown timer has expired, the game controller 10 will service AWSs 8 and workstations 16 as well as the other devices connected to game controller 10 in accordance with the operational descriptions in the specification. In general, to fulfill the functions of servicing AWSs 8 and workstations 16, game controller 10 will accept wagers from AWSs 8, post the wagers by recording them on printer 14 and hard disks 18, and acknowledge the receipt of wagers. Game controller 10 will also perform game management functions initiated through workstations 16, such as reconfiguring the game, adding and deleting accounts, and adding money to and removing money from the accounts. Further game management functions serviced by game controller 10 will be described in detail later.

When the game countdown expires, the game controller 10 will close the game, meaning that further wagers will not be accepted. The game controller 10 will then run the game. Running the game involves signalling the RNG 12 that a random draw is desired, whereupon the game controller 10 will receive data constituting a twenty-number random draw from the RNG 12. The game controller 10 then pays the winners by comparing the random draw results to each "ticket" received from an AWS 8 and determining with reference to a system paytable the extent of the prize, if any, to be awarded. The game controller 10 will then credit the account of a winner with the appropriate amount and enter a corresponding debit to a control account in a manner which will be described in more detail later. After paying the winners, the game controller 10 will transmit the results of the draw to individual AWSs 8. These transmissions will include the drawn numbers, which will be sequentially displayed by AWSs 8, and will also include the amount of winnings, if any, to be displayed for the patron using the AWS 8. After transmitting the results to AWSs 8, the game controller 10 increments the game number and opens a new game, starting the process anew.

A description of the individual program and data files of game controller 10 and the functions performed by each is contained in Appendix B, contained in the microfiche appendix to the specification. Referring now to Appendix B, the programs available on game controller 10 include data entry programs, manager programs, system monitoring programs, reports programs, system programs, and utility programs. Descriptions of system data files are also provided.

The system is designed to be menu-driven, and therefore easy to operate. The Data entry programs, manager programs, system monitoring programs, and reports programs are accessed from menus displayed on workstations 16 or security monitor 11, as appropriate. Password protection will be applied to programs, so that only employees who are authorized to run a particular program may do so. The system programs are the basic functional programs of the system and run continuously from the time game controller 10 is powered up. These programs include KENOENG.EXE, which is the main program that performs the functions shown in the flowchart of FIG. 6. Utility programs are also provided for system maintenance purposes.

In the preferred embodiment, game controller 10 is made up of two separate but connected "fileserver" computers which run the same programs: main fileserver 13 and backup fileserver 15. Each of these fileservers 13 and 15 will have associated with it one of the two disks 18. The main fileserver 13 will in normal operation conduct the draws and administer the game, while the backup file server 15 will operate in a standby mode in which it maintains a mirror record on its disk 18 of the records on disk 18 of the main fileserver 13. The fileservers 13 and 15 of game controller 10 control token ring network 17, allowing authorized workstations 16 to run system administration programs which will be described later in more detail. The game controller 10, through its component main fileserver 13, also accepts wagers and provide operating data and communications to and from AWSs 8. The game controller 10 further provides information to a security monitor 11, which may be a component of backup fileserver 15, and controls printer 14 which maintains a secure hardcopy record of system transactions. The game controller 10 controls the operation of the keno game in the manner described previously. The game controller 10 determines the countdown period, accepts wagers from AWSs 8 during the specified period, and transmits a message to RNG 12 requesting a draw of 20 numbers. The draw is received from the Random Number Generator (RNG) 12, and the game controller 10 updates player accounts accordingly and transmits information on the game to particular AWSs 8 over the fiber optic network 20 for display on the AWSs 8. While in normal operation the main fileserver 13 will control the operation of the game, in case of a failure in main fileserver 13, the backup fileserver 15 can take over operation of the game without substantial down time since backup fileserver 15 maintains a mirror copy of the data files on main fileserver 13.

Game management is accomplished primarily through workstations 16 connected to the game controller 10, through secure token ring network 17. A number of workstations 16 will be provided. Many of the workstations 16 will be associated with cashier stations at which players can establish accounts, add money to accounts, and withdraw money from accounts. These cashier stations will generally have cashdrawers associated with them. Employees are assigned a Username and a password which are used to track all administrative and cashdrawer transactions. The employees are assigned to function classes and have monetary limits to regulate the transactions which they are authorized to handle. A cashdrawer accounting system operating on game controller 10 keeps track of all deposits and withdrawals on the system 2. All transactions, both player and administrative, are logged on the two separate hard disk drives 18 which operate in parallel to provide backup data storage, and the game transactions are further backed up by audit log printer 14 which provides a hard copy of all ticket and game results. As noted previously, it will usually be desirable to provide two parallel-operating computers to perform the functions of game controller 10, each having all the connections shown for game controller 10, with each associated with one of the parallel hard disk drives 18, to provide a redundant, robust system which can continue to operate despite a failure in either of the two sets of a fileserver and a hard disk drive 18.

The card encoder 19 is shown as connected to the game controller 10, although card encoders 19 could also be attached to the workstations 16 if desired. Card encoder 19 will be controlled by a card encoding control program running on workstations 16 and is used to encode the account identifying cards for the use of patrons.

The system 2 is designed with security and control as prime considerations. The design, which consists of AWSs 8 connected to a central game controller 10, allows complete control of all transactions. The central game controller 10 and Random Number Generator 12 will be kept in a locked enclosure. Since the AWSs 8 only pass the "tickets" to the controller, tampering with an AWS 8 can provide no advantage in the game. Since all transactions are electronic and are carefully logged and monitored, any tampering would be reported and logged. The game is closed prior to the game draw being obtained from the Random Number Generator 12, so there can be no tampering which would affect the game results.

No game transactions can take place without using an account card which has an authorized account number combined with a security number. Therefore, no unauthorized game transactions can be introduced. All game transactions are logged on two redundant parallel hard disk drives 18, and are printed on the audit log printer 14. This hard copy audit trail eliminates the possibility of being able to change any game results after the game is completed.

All administrative activity requires an employee Username and password to be entered prior to the activity, and all adjustments to a player account or to an employee record are recorded and available for monitoring. The Random Number Generator 12 is monitored to prevent tampering. Any loss of power to the RNG 12 causes a controlled Game Controller 10 shutdown to prevent any further activity.

The operation of the system, including the Paytable which determines game payouts, is based on configurations which determine the payouts and the way the game is run. These configuration files are protected by a modified Checksum system which will warn of any unauthorized changes which will affect the game results. No workstation 16 has access to the system programs, nor even to the operating system of game controller 10.

Access to the system programs and the databases via the Token Ring network 17 requires a network password. This eliminates any tampering with the programs or databases which might be performed by adding an unauthorized workstation into the network. An authorized workstation could reboot with a DOS disk and gain access to the network, but still would not be able to access the databases or programs without an approved network password.

To prevent the unauthorized modification of critical databases, a modified database checksumming technique has been developed. When the transaction processing routines of game controller 10 update a critical database, the ASCII values of each byte in the database are summed and the two byte result is appended to the file. Then, every time a system program accesses this critical database, it must first recalculate the checksum and compare it to the appended checksum. If these checksums do not match, it will be apparent that unauthorized modification of the database has occurred. The program will then print an error message and initiate a shutdown of the Game Controller 10. The game will remain shut down until the situation is investigated and resolved.

Rather than being a simple summation, the checksum used is a modified summation in which a summation dependent algorithm is applied to the summation to produce the modified checksum. This further mathematical operation makes it impossible for a person to modify the data files and change the checksum correctly without knowledge of the secret algorithm used to construct the modified checksum. The algorithm used should be one of a large number of possible algorithms meeting the following requirement: The algorithm must be a closely-held secret, and must vary depending on the summation of the data so that it cannot readily be decoded by observing the files at different times and noting the modified checksums determined. In the preferred embodiment, the algorithm includes: summation of the database data to form a checksum, and modification of the checksum according to a predetermined algorithm which operates differently for different values of the checksum. For example, the checksum might be multiplied by a prime number determined as a function of the checksum. The particular algorithm chosen is not important, as long as it conforms to these requirements. In fact, it will normally be desirable to provide a different algorithm for each system 2 installation, and also to change the algorithm used in a given installation at periodic intervals.

The techniques disclosed have the advantage of detecting database corruption due to hardware failures and software failures, in addition to changes due to database tampering.

The system further incorporates a double entry accounting system in which accounts are maintained for both the casino and the players. A debit or credit to a player account is always accompanied by a corresponding credit or debit, respectively, to a casino account. Because of the dual entry system, any modification of a player account other than through normal system operation would cause an imbalance between the totalled accounts which would trigger an investigation. Specifically, each time a game transaction is processed into the system, a player's account is updated and an equal but opposite entry is made to the casino's account, which is also maintained in the system. For example: If a player won five dollars in a game, the player's account record would be updated to reflect a win of five dollars, and the casino's account would be updated to reflect a loss of five dollars. The game controller 10 keeps track of all game activity by players. The following equations describe a correct state of the system:

Casino's Win=Promo Players' Losses +Permanent Players' Losses

Casino's Losses=Promo Players' wins +Permanent Players' wins

The system applies these formulas to the accounts database at regular intervals to ensure that data corruption has not occurred. If data corruption were to occur as result of hardware failure, software failure, or unauthorized data tampering, the system will shut down until the situation is resolved. Further, all accounts are periodically cross checked against themselves to ensure that no data corruption has occurred. The system applies the following formula to accomplish this cross checking:

$$Balance = Wins + Prizes + Deposit + Credits - Losses - Debits - Withdraws$$

An Employee Tracking system adds greatly to the security of the system. Any transaction completed on a workstation is logged with the following information: Date and Time, Workstation Number, Employee Username, Player account adjusted if applicable, and the specific function performed. This information is available on a real time monitor, as well as in printed reports. Any transaction which involves large amounts of money or account credits requires a Manager authorization code to complete. The Manager code used is also recorded in this situation. This makes it nearly impossible for anyone to tamper with accounts or change the game configuration without detection.

A Cash Drawer Accounting system used in conjunction with the Employee Tracking system makes it impossible to perform unauthorized transactions without detection. When a cashdrawer used at a cashier station associated with a workstation 16 is taken by a cashier at the beginning of a shift, the amount in the cashdrawer is entered into the game controller 10 by the manager. An expected balance of the cashdrawer is maintained by the game controller 10, which adds or subtracts from the expected balance the amount of each transaction conducted at the workstation 16 which involves adding money to an account or withdrawing money from an account and which therefore involves increasing or decreasing the amount of cash in the cashdrawer. The expected balance is checked against the actual balance at the end of the shift. Any cash removed from a cashdrawer without a workstation entry would cause the cashdrawer accounting system to show a drawer short situation during the end of day procedures. The drawer short situation is logged to the Employee record which can be accessed by a Manager on a workstation screen, as well as displaying on the printed reports.

The workstations 16 will not allow a withdrawal without recording it as either a cashdrawer bleed (authorized transfer of cash to another location) or a player account payout. Both are logged on the Audit Log which is stored on disks 18 and printed on printer 14. Therefore, any cash transaction, whether authorized or unauthorized, will be detected and reported. The integration of the total cash management system including cashdrawer management and account management functions with the actual game operating system results in a system capable of cross-checking of various functions to detect any attempt at fraud or manipulation.

The amount paid out for any winning combination is determined by a Paytable. The Paytable is configured with a system workstation 16, and requires the entry of an authorized manager access code. Any changes to the Paytable are recorded with the identification of the Operator and Manager performing the task. Even if it were possible to make changes to the paytable other than by using an authorized program, they would be caught by the checksum protection and data integrity checks.

A security monitor 11 is associated with the game controller 10. In a preferred embodiment, the security monitor 11 is made functional by a program running on the backup fileserver 15 of game controller 10. The backup fileserver 15 will in this embodiment be equipped with a color monitor screen which forms security monitor 11. Security monitor 11 is used to display a Security Monitor screen. The security monitor 11 may also be used to view game or workstation activity screens as desired. The Security Monitor 11 or the backup fileserver 15 provides audible alert tones to notify the Operator of situations that require employee action.

If the Call Attendant key is pressed on an AWS 8 the security monitor 11 will emit one beep to alert a security operator. When a bonus prize is won, the security monitor 11 will emit three beeps, and display all pertinent information including the AWS 8 number and identification, the player account number, the win description, the pick/catch combination, game number and time. Should a Handpay amount be won, the Security Monitor 11 will emit a loud siren warning tone and the winning AWS 8 will be locked up to prevent further activity until the Handpay win is paid and cleared. A Manager authorization code must be entered on a workstation 16 to clear the Handpay Prize, and a specially punched Handpay Clear card must be inserted into the AWS 8 to unlock it for further activity.

By accessing a Customer Dispute screen, a Manager can view the information comprising a specific winning "ticket." This screen allows the viewing of the Audit log directly, and provides the same information printed by the Audit Trail printer. The Customer Dispute screen will display the following information on the winning ticket: Player account number and player name, the Automated Writer Station identification (usually the location), the picks made on the winning ticket, the time the ticket was vended, the numbers drawn and the amount won. Therefore, before paying any Handpay limit awards, the Manager has the ability to check whether the ticket is valid and to which player account the win should be credited.

A Workstation Monitor screen may be accessed fron any workstation under the System Monitors menu. It is used to display the programs currently being used by the system workstations 16. The screen shows the authorized workstation 16 numbers, the status of all workstations 16, the Username of the operator logged in on the station 16 if it is active, the program name being used, the time the program was accessed, and the time the Operator logged on to the workstation 16. This monitor screen, in conjunction with other safeguards, provides security against attempts to tamper with the system.

The Workstation Activity Monitor screen is accessed directly on the screen attached to game controller 10. The screen displays a real-time log of all workstation activity. The information presented on this screen will alert management to any unusual or unauthorized activity which has occurred or is occurring on any workstation 16 on the system. It presents data from the Audit Log related to the workstations, including the following:

1. Workstation 16 status with the number of workstation 16, Username of the present Operator, the type of transaction laat processed and a cumulative total of transactions.

2. A real-time log of transactions from all workstations active on the system. It presents the workstation number which processed the transaction, the Username of the Operator, the class and type of transaction and the time the transaction was processed.

3. The number of bad transactions, the last transaction delay, the maximum transaction delay and the average transaction delay.

A hardcopy Exceptions Report printed on printer 14 or another designated printer associated with the system detects and highlights all unusual activity on the system, whether involving workstations or AWSs 8. The activities highlighted on this report can also be found on the Audit Log, and game activities can also be found on the hardcopy printed by the Audit Trail printer 14. The activities highlighted by this report include: Workstation 16 reboots, AWS 8 power failures and communication failures, All Front End Controller error messages, Card Reader 25 failures, Call Attendant signals generated from call attendant buttons 28. The report on any of these activities would include information outlined under the full Audit Log, the Customer Disputes Monitor and the Workstation Activity Monitor sections.

An Audit Log Backup procedure copies the Audit Log from the Backup Fileserver hard drive to a floppy disk on the Backup Fileserver. This procedure should be accomplished every day following the End of Day procedures. The End of Day procedures prompts the Audit Log backup to be completed, but it may be done at other times should circumstances dictate. When the Audit Log Backup is completed following the End of Day procedures, it will reflect one complete day of Audit Log activity.

A Tape Backup procedure copies the entire Audit Log and Database to a backup tape. This procedure should be accomplished once a week, or after any major changes, to insure that the database that is maintained on the two fileservers 13 and 15 can be restored should both fileservers be destroyed or contaminated.

As explained previously, the system 2 has been particularly designed to prevent any foreseeable attempts to cheat or tamper with the system. It incorporates several novel protection techniques which provide exceptional security to the operation of the keno game.

Since the AWS 8 is a display terminal which only allows ticket information to be entered and sent to the Game Controller 10, there is nothing that can be done to the AWS 8 that will affect the results of the game. Physical assaults, interrupting the power or communications to the unit, use of magnets or electrical field generators, or any other conceivable tampering attempts will not change the results of the game. The game is totally controlled by the Game Controller 10.

Inputs from the AWSs 8 or from unauthorized terminals introduced into the fiber optic network 20 therefore cannot change any system operating parameters or any game results. The program is designed to accept changes only from authorized stations on the Token Ring Network 17. Since the AWS 8 fiber optic network 20 is a fiber optic network, connecting an unauthorized terminal to the network 20 would be very difficult and would require knowledge and equipment which is much less common than knowledge of, for example, RS-232 networks. Also, tampering with the fiber optic network 20 would in most cases cause errors to be logged in the system.

The game controller 10 only accepts transmissions from AWSs 8 that have been configured on the system and which have an authorized address in fiber optic network 20. Therefore, it would be extremely difficult to cheat the system by tampering with AWSs 8, or by attempting to introduce unauthorized terminals into the fiber optic network 20.

No activity at workstations 16 can take place on the system 2 without being monitored and reported. Any significant activity requires a manager authorization code for completion. System workstations 16 do not have access to the programs or databases, and do not have the capability to access the operating system of game controller 10. Should a foreign computer somehow gain access to the Token Ring network 17 linking game controller 10 and workstations 16, it would not be able to access system programs or databases without a valid network password.

The only way a workstation 16 could significantly change the results of the game would be to tamper with the system Paytables. Tampering other than through a system program with an authorized manager password would be detected by the critical database checksum algorithm. Changes to the Paytables would be visible to the real-time monitor screens, and logged on the Audit trail. No large payoffs (handpay amounts) would be paid without checking the validity of the win through the various safeguards mentioned above. It is thus impossible to tamper with the system through workstations 16 without detection.

The structure of game management section 6 is also designed to prevent tampering which would influence the draw in any way. The draw is provided by the Random Number Generator 12 which will generally be secured in a locked enclosure by the casino, along with the main file server. Upon any interruption of power or communications to the RNG 12, Game Controller 10 is programmed to automatically shut down and terminate the game.

These events would also generate a game controller 10 error measage which would display on the game controller 10 monitors and the hardcopy Audit Trail printout on printer 14. The shutdown and restart of the game controller 10 would be logged along with the times and the name of the Manager who performs the restart.

The program of game controller 10 is also designed to prevent an inadvertent 80 number draw which would make all tickets big winners. The system is preferably designed throughout to handle only 20 numbers. None of the registers or message lengths accommodate more than 20 numbers. Should more than 20 numbers somehow be introduced as a draw due to a failure in RNG 12, the system would only use 20 numbers for game calculations and would ignore the others.

The system 2 also has built in safeguards to protect against unauthorized card production. First, a unique security number is automatically assigned each time a card is punched. The account number could be punched into a duplicate card, but the system would not accept it with the wrong security number. In addition, all cards, in order to be accepted by the system, must have valid checksums and Cyclic Redundancy Checks which are calculated from the account number and/or security number. Algorithms specific to each location may be developed for producing and punching the card checksums, Cyclic Redundancy Checks, and security numbers.

If an account card could be obtained, an exact copy of the account card could be manufactured and played against the credit, if any, existing on that account, but any significant wins would require the card to pass detailed scrutiny and the player would have to show sufficient valid identification to receive a large win or withdrawal payment.

Security, accountability and accounting capabilities are strengthened by the Audit Log which is recorded on the two separate hard disks 18. Data for all transactions showing the time, the workstation 16 or AWS 8 used, the employee involved where appropriate, and the details of the transaction are recorded both in parallel log files on the hard disks 18. In addition, the Audit Trail printer 14 provides a running hardcopy of all game transactions which is permanent in the sense that the paper copy can be reviewed regardless of the operating state of the system 2.

Operation of the game management section 6 requires configuration, enrollment of employees, and performance of daily management functions.

In general, The system 2 operates based on configurations established during the installation process. A Manager is able to change the configurations as required to ensure desired system operation.

Once configured, employees are enrolled and assigned a Username and password. A function class and monetary limits are assigned to each employee to regulate the type of transaction the employee is authorized to handle.

Daily management of the system involves: Opening and closing the shifts, activating and closing each shift cash drawer account, routine management of player accounts, and initiating daily End-of-Period process and report printing.

The system configuration process will now be described in detail. Certain system parameters are first selected to set up the game. The Configuration process includes the following parameters:

1. AWS Configuration—Establishes the active Automated Writer Station units on the system and specifies their identification or location.

2. Prize Configuration—A Bonus Prize is an extra award to increase the incentive to play. It can be any desired prize for any combination of picks and hits. Example: Deck of Cards for hitting 0 out of 8 picks. A Bonus Prize hit is displayed on the Automated Writer Station display and is logged on the audit trail.

3. Series—The series of the Instant keno game.

4. Casino Name—The name of the Casino where the system is installed.

5. System Name—The name given to the system by the Casino. This name will display on AWSs 8 and on the workstations 16.

6. System Version—The update version installed on the system.

7. Maximum keno Payout—The maximum total payout for any one game, including all winners.

8. Handpay Limit—The maximum amount that may be paid out by an authorized employee without manager intervention. Often set at the IRS limit to insure the completion of proper paperwork.

9. Value of a Credit—Value of one credit in cents. One credit is the amount between the BET ONE key is pressed.

10. Closing Shift—The closing shift for accounting purposes. At the end of this shift, the Operator will be prompted to print the Day End reports.

11. Maximum Bet—The dollar amount that is bet when the BET MAX key is depressed.

12. Ball Display Delay—The time delay between the display of each ball during the display of the draw on the AWSs 8. Usually 1 second or less as it affects the amount of time required to play a game. This time multiplied by 20 is the time required to display the draw.

13. Countdown Time—Time that the game is open for play. This time plus the draw display time equals the approximate time required for each game, as the actual game processing time is very short.

14. Pay Table—This table sets up the pay ratios for the pick/hit combinations possible on the game. An Odds-Maker program is available to assist in setting up this table.

15. Source Codes—Codes that are displayed on the player account records to indicate where the player heard about the game. The source codes are used by Marketing to evaluate the effectiveness of the Marketing programs.

16. Set Accounting Date—Establishes the official date for accounting purposes. This date changes at the end of the selected closing shift. This screen also sets the system time and date.

17. AWS Messages—This procedure selects the messages that are displayed on the AWSs 8 during an attract sequence (for enticing patrons to play) and for the various game operation functions.

The paytable is configured using the Odds Maker program. This program calculates the hold and payout percentages for a specific pay table. This helps the Manager develop pay tables that will yield a desired hold and payout percentage. The Manager Is prompted to enter the base rate of a ticket, and the number of spots played on the ticket. The amounts to be paid for catching each number of spots is then entered, and the hold percentage is automatically calculated. The amounts entered can be adjusted until the desired hold percentage is achieved.

Once the system is configured, the Employee Database must be established to allow administrative activity to take place. (One Manager-class employee Username and password are originally established in the system to allow configuration of the system). Employees who will be working with the system are entered using the Enroll Employee and Employee Display/Update screens. These screens allow the entry of the Employee name, address, a unique password, shift and work times and dates, the appropriate monetary limits the employee is authorized to handle, the class of transaction the employee is allowed to complete, and other administrative information. An I.D. number is assigned by the system. The classes are:

1. Manager—Authorized to perform system configurations and management functions, and to approve functions beyond an Operator's limits.

2. Cash Drawer—Authorized to handle cash drawers for the purpose of selling cards and paying out account balances up to the specified limits.

3. Adjustment—Authorized to make adjustments to the player accounts up to the specified limits.

4. Data Entry—Used for employees who>enter player account and employee record information.

For security and accounting purposes, any adjustments to the player accounts and to the employee records are logged on the audit trail and may be displayed on the appropriate workstation screens. An employee must enter a valid username and password to log on to the system workstations 16. Any transactions that take place will then carry the Username to identify the employee who completed the transaction. An employee will be able to complete transactions only within the dollar limits set by the enrollment process.

As noted previously, accounts may be established as promotional accounts or as regular accounts. Promotional accounts are established with a number of prepunched cards with a configurable account balance for each card. Each Promotional account has an account Coordinator who is responsible for the handling and distribution of the cards.

Promotional group accounts, such as might be offered to tour operators, may be established by using the Enroll Promotional Accounts procedure. As cards are sold and played, the system increments the receipts Balance Due for outstanding card sales. The seller must then deposit the receipts from card sales to the Promotional account to clear the Balance due. Amounts won by the Promotional account players are reflected in this Promotional group account balance for accounting purposes.

The cash from card sales is deposited into the group account through the Promotional Account Maintenance screen. This cash is tracked through Cashdrawer shift accounting. At the end of each shift, each cashdrawer operator must turn in his closing drawer balance. The system will automatically calculate the over/short based on the opening balance, cashdrawer activity for the shift, and closing balance. The establishment then tracks the cash and accounting information using standard business practices.

The Promotional group account will show the number of cards enrolled, the value for cards enrolled, receipts deposited, and the balance due from card sales.

The Promotional account card has a unique identification code which is used to track the individual account balance. The player may purchase additional credits to his account, and may withdraw the account balance at any time. The account record, which is accessed for a withdrawal will indicate whether the card has been played and the date of the last play.

Players who are regular customers may enroll as permanent players and receive a permanent player account card. Permanent accounts are established with the Enroll Permanent Accounts procedure. In this case, the account balance is maintained according to the amount deposited to the account, the amount wagered, the winning credits, and the amount withdrawn.

The system allows routine account maintenance functions such as delete, transfer, adjust, withdraw, and deposit. Any such transactions are logged on the audit trail and may be displayed on appropriate workstation screens.

The daily routine management of the system will now be described. Generally, the daily routine includes opening the shift, opening the shift cash drawers, player account maintenance, and day end procedures. When the system is ready for operation, the shift must be opened by a Manager, and all cashdrawers must be opened with an established balance. To open a cashdrawer, an employee must enter an authorised Username and password. The system will check the appropriate employee record to determine if the employee is authorized for this operation.

Each shift is opened by the Shift Manager using the Shift Management screen located under the Manager Functions menu on a workstation 16. The Manager simply accesses the screen, enters a Manager class password, and enters the number of the shift to be opened. This opens the shift accounting registers and starts the accumulation of shift data.

Each authorized employee who will be selling account cards, entering deposits to an account, or withdrawing money from an account, will be required to open a cashdrawer. The employee obtains the physical cash drawer with a given amount of cash in it. The employee enters the proper Username and password in the Login screen on the workstation and accesses the Caah Drawer Management screen. The shift number and the opening amount of money in the cash drawer are entered into the system to start the shift accounting on each cashdrawer.

When a player approaches the location of a cashdrawer-equipped workstation 16 to purchase an account card, the cashier may sell the player a promotional account card with a configurable pre-established balance and deposit the money in the cash drawer. The amount deposited will be entered into the proper promotional account on the Promotional Account Maintenance screen. A receipt may be printed on a printer associated with the workstation 16 if desired.

A regular player may also purchase an individual account card with an initial balance and play against the balance. The cashier will enroll the player by entering account information on the Enroll Permanent Player screen.

A player may also cash in his account card. The cashier accesses the account record by typing in account information or by inserting the card into a card reader associated with the workstation 16. The account balance is withdrawn from the account on the Account Maintenance screen, and the cashier pays the balance amount to the player. A withdrawal slip may be printed on a printer attached to the workstation 16.

The player account tracking system has the capability to make all required entries and changes to the player account. The operator may perform one of the following functions using this portion of the program: Delete the account, Transfer the balance to another account, Combine accounts, Change name, Adjust balance, List adjustments, List prizes, Update, View detail, and Deposit to an account.

The cashier may also remove money from the cashdrawer and add money to the cashdrawer using "Fill" and "Bleed" procedures. These changes are considered in the cumulative cashdrawer balance which will be checked at the end of the shift.

Each transaction made by an Operator or Cashier is logged and printed out on the audit log using printer 14, accompanied by the Employee Username. Any adjustments to an account are also recorded in a separate buffer and may be viewed by a Manager with the proper authorization.

At the end of the shift, the Cashier will count the money in the cashdrawer and enter the existing balance on a Cashdrawer signout screen. This balance is checked against the calculated balance and the difference is indicated on the employee shift end report which is automatically printed. The Cashier then signs out and turns in the cashdrawer.

When all employee shift cashdrawer accounts have been closed, the Manager will close the shift. This ends the shift accounting, closes out the shift records, and automatically prints the end of shift reports. At the end of the closing shift, the End-of-Day procedures will be run to close out the day and print the End-of-Day reports.

The present system provides substantial tracking capability. Various reports keep track of all transactions and summarize data by day, month, year and system-to-date. Reports available on the system include: Casino Totals, Promotion Totals, AWS Daily, AWS Maintenance, AWS History, Shift End Cash drawer, Shift History Cashdrawer, Employee Shift Cashdrawer, Employee History Cashdrawer, Complete Audit, and Occurrence of Balls.

The Casino Totals Report is used to track the totals for Permanent Accounts, Promotional Accounts and the Casino Account for four periods (DTD, MTD, YTD, STD) This report provides information on: Won, lost, bonus prizes, deposits, withdraws, debits, credits and balance. The amounts in each category in the casino account sections will be inversely proportional to the sum of the amounts in the Permanent and Promotional account sections. A win in the Permanent or Promotional accounts section is reflected as a loss in the Casino account. The fields included in the report are as follows: Won—Amount won by Perm Players, the Promos, or the Casino; Lost—Amount loat by Perm Players, the Promos, or the Casino; Prizes—Dollar value of Prizes; Deposits—Dollar value of Deposits; Withdraws—Dollar value of Withdraws; Debits—Dollar value of Debits; Credits—Dollar value of Credits; and Balance—Acct Balance of Perm Players, the Promos, or the Casino.

The Promotions Totals Report is used to track the totals for Promotional accounts for four periods (day-to-date, month-to-date, year-to-date, and system-to-date). This report provides information on: Won, lost, bonus prizes, deposits, withdraws, debits, credits and balance. The fields of the report are defined as follows: Won—Amount won by promotion accounts; Lost—Amount lost by promotion accounts; Prizes—Dollar value of Prizes; Deposits—Dollar value of Deposits; Withdraws—Dollar value of Withdraws; Debits—Dollar value of Debits; Credits—Dollar value of Credits; and Balance—Account Balance of Promotional Accounts.

The Automated Writer Station Daily Report is used to track daily totals for Automated Writer Station activity. This report provides information on: Payouts, Handpays and Bets. The fields included are defined as follows: AWS No.—The number assigned to an AWS 8 by the system; Description—Name entered by user, which may describe the location of AWS 8; Payout —Dollar value of AWS Payouts; Handpay—Dollar value of Handpays for an AWS 8; Bets—Dollar value of bets at an AWS 8.

The Automated Writer Station Maintenance report is used to track totals for number and description, the total number of occurrences of call attendant, power fail and reader error, plus the present online/offline status. The following fields are included in the report: AWS No.—The number assigned by the system to an AWS 8; Description—Name entered by user, sometimes the location of AWS 8; Call Attendant—Number of times the Call Attendant button 28 was pressed on the AWS 8; Power Fail—Total number of power failures experienced by AWS 8; Reader Error—Total number of reader errors experienced; Status—Present status of the AWS 8 at time of report.

The Automated Writer Station Play History Report is used to track totals for AWS activity for four periods (Day-to-Date, Month-to-Date, Year-to-Date, and System-to-Date). This report provides information on: Payouts, Handpays, Bets, Vends, Call Attendant, Power Failure and Reader Error. The fields included are defined as follows: Payout—Dollar value of AWS Payouts; Handpay—Dollar value of AWS Handpays; Vends —Number of games played; Call Attendant—Number of times the Call Attendant button was pressed on the AWS unit; Pwr Fail—Number of power failure occurrences; Rdr Error—Number of errors by card reader 25.

The shift-End Cashdrawer Totals by Workstation Report is used to track the information on Drawer Over, Drawer Short and Closing Balance for each workstation. The following fields are included in the report: Ws No.—The Workstation number assigned by the system; Closng balnce—Balance on hand at Shift Close; Drawer over—Amount that actual Cash-out exceeds calculated; Drawer short—Amount that the Cash-out is less than calculated.

The Shift-End Cashdrawer Totals by Workstation Report is used to track shift-end workstation totals for four periods (Day-to-Date, Month-to-Date, Year-to-Date, and System-to-Date). This report provides information on: Draw over, draw short, over minus short, bleed, fill, bleed minus fill, deposits, withdraws and deposits minus withdraws for each workstation. A workstation summary is also shown. The report includes the following fields: Drawer over—Amount that actual Cash-out exceeds calculated; Drawer short—Amount that the Cash-out is less than calculated; Drwrover-shrt—Over minus Short; Drawer bleed—Amount of money removed from the cash drawer; Drawer fill—Amount of money added to the cash drawer; Drwr bld-fill: Bleed minus fill; Deposits—Amount of deposits to the cash drawer; Withdraws: Amount withdrawn from the cash drawer; Dpsts-Wthdrws: Deposits minus Withdraws.

The Shift-End Cashdrawer Totals for Employee Report is used to track shift-short, drawer fill and bleed, deposits, withdraws, opening balance and closing balance. The fields included are defined as follows: Drawer over: Amount that actual Cash-out exceeds calculated; Drawer short: Amount that the Cash-out is lesa than calculated; Drwr over-shrt: Over minus Short; Drawer bleed: Amount of money removed from the cash drawer; Drawer fill: Amount of money added to the cash drawer; Drwr bld-fill: Bleed minus fill; Deposits: Amount of deposits to the cashdrawer; Withdraws: Amount withdrawn from the cashdrawer; and Dpsts-Wthdrws: Deposits minus Withdraws.

The Employee History Cash Drawer report is used to track ahift-end employee totals for four periods (Day-to-Date, Month-to-Date, Year-to-Date, and System-to-Date). This report provides information on: Drawer over and short, Drawer fill and bleed, deposits and withdraws. The fields used are as follows: Drawer over: Amount that actual Cash-out exceeds calculated; Drawer short: Amount that the Cash-out is less than calculated; Drwrover-shrt: Over minus Short; Drawer bleed: Amount of money removed from the cash drawer; Drawer fill: Amount of money added to the cash drawer; Drwr bld-fill: Bleed minus fill; Deposits: Amount of deposits to the cashdrawer; Withdraws:

Amount withdrawn from the cashdrawer; Deposits-Wthdrws: Deposits minus Withdraws.

The Complete Audit Report prints the entire audit log for the period selected. However, criteria may be set to print separate audit reports based on the class of transaction. For instance, if "Game" class is specified, only the audit log of game transactions will be printed. This criteria selection allows the audit log reports to be selected for only the particular information desired. The Audit reports can be printed using the following criteria: Game—Prints Audit Log data on all game transactions; Cashdrawer—Selects all cash drawer transactions; Adjustment—Prints adjustments to the player accounts; Data Entry—Summarizes all entries to the database; Manager—Displays all transactions performed under a Manager authorization code; Exception—Presents all tranaactions which have triggered an exception message; System—Prints all transactions generated automatically by the system program (draws, calculations etc.).

The Occurrence of Balls Report is used to track the number of times each number was picked for the period of the report. This report reflects totals for Day-to-Date, Month-to-Date, Year-to-Date, and System-to-Date periods. The following fields are included in the report: Ball Number; DTD Occurrence—Number of times ball has been drawn in period; MTD Occurrence—Number of times ball has been drawn in period; YTD Occurrence—Number of times ball has been drawn in period; STD Occurrence—Number of times ball has been drawn since system installation.

All report data reflect the period for which the data is required. Prior to printing the reports, an End-of-Period (EOP) procedure is completed which retrieves the current data and stores it in period summarized registers. The reports printed will then reflect the data from the selected End-of-Period procedure. End-of-Period data may selectively reflect any of the End-of-Day, End-of-Month, End-of-Year and System-to-Date periods.

Thus, a system has been described which provides a secure, automated casino game with needed operational tracking and which is substantially fail-safe.

We claim:

1. An automated writing station for transmitting wager information to a central game controller to which a plurality of said writing stations are attached for playing a game of chance in which a group of symbols is selected from a large number of predetermined possible symbols, and for displaying results of the game, comprising:

keypad means operable by a patron for receiving wager information identifying symbols selected by the patron for the game of chance, said keypad means including a plurality of switching means each associated with one of the possible symbols for alternatively selecting and deselecting the symbol associated with the individual switching means when the switching means is activated by the patron;

account identifying means for receiving account identification information from the patron identifying a wagering account having a balance maintained within the central game controller;

wager activation means for generating a wager signal, in response to action by the patron, indicating that the wager information currently selected by the keypad means is to be entered as an irrevocable wager;

processing means connectable to said central game controller and connected to the keypad means, account identifying means, and wager activation means for receiving said wager information and said account identification information, and in response to receiving said wager signal, irrevocably transmitting signals to said central game controller, including the wager information and the account identification information, indicating that the wager information should be entered by the central game controller as an irrevocable wager associated with the patron account identified by the account identification information, and for subsequently receiving game results from said central game controller;

display means connected to the processing means for displaying the game results to the patron.

2. The automated writing station of claim 1 wherein the display means includes a plurality of display elements, each with a plurality of visually distinct states, and each aligned with one of said switching means of said keypad means, for displaying a first visually distinct state when the switching means associated therewith has not been activated by a patron to select a symbol, a second visually distinct state when the switching means associated therewith has been activated by a patron to select a symbol, and a third visually distinct state when a symbol associated with the display element has been chosen in the game by the central game controller.

3. The station of claim 2 wherein said display elements have a fourth visually distinct state and wherein said display means further includes highlighting means for activating said fourth visually distinct state when a symbol associated with the display element has been selected by the patron in a wager and is also selected in the game by the central game controller.

4. The station of claim 3 wherein said active states are differentiated by a color transmitted by said display elements.

5. The station of claim 4 wherein said display elements are grouped light emitting diodes including diodes of at least two colors.

6. The station of claim 5 wherein said display elements are grouped tricolored light emitting diodes.

7. The station of claim 3 wherein said fourth active state includes flashing of said display elements.

8. The station of claim 1 further including attendant signalling switch means connected to the processing means and operable by a user of the station to cause said processing means to transmit a signal to said central game controller indicating that assistance is desired at said station.

9. The station of claim 1 wherein the account identifying means includes means for accepting keyboard entries of the patron which identify an account maintained by the central game controller.

10. The station of claim 1 wherein the account identifying means includes card reading means for reading account identification information from a card inserted by the patron.

11. The station of claim 10 wherein said card reading means includes means for detecting punched locations in a card to obtain the information identifying an account.

12. The station of claim 10 wherein said card reading means includes means for scanning a magnetic strip contained on said card to obtain the information identifying an account.

13. The station of claim 10 wherein said card reading means comprises means for reading (a) an account number, (b) a security code associated with the card, and (c) validation data generated by at least one mathematical operation on at least one of said account number and said security code.

14. The station of claim 10 wherein the card reading means operates to read only account identifying information and is inoperable to read an account balance from the card.

15. An electronic cashless betting system for conducting an automated random selection game including a random drawing of a defined number of symbols from a larger defined set of possible symbols, comprising:
  A. a central game controller including:
    a. account maintenance means for storing records of patron accounts, each patron account record including an account balance;
    b. wager recording means operable during a wager receiving period for electronically collecting and recording irrevocable wagers comprising a patron's choice of predicted symbols and account identifying data associating the patron with one of said patron accounts;
    c. drawing means connected to said account maintenance means and wager recording means for performing said random drawing to choose the defined number of symbols, and thereafter making an adjustment to said patron account, the value of said adjustment determined according to a predefined paytable defining payoffs based on the level of coincidence between each patron's predicted symbols and the actual symbols chosen in the random drawing; and
    d. results reporting means for transmitting results of the drawing to patrons subsequent to said wager receiving period; and
  B. a plurality of writing stations connected to the central game controller, each writing station including:
    a. keypad means operable by a patron for permitting the selection and deselection of symbols selected by the patron for the game;
    b. account identifying means for receiving account identification information from the patron identifying a wagering account having a balance maintained within the central game controller;
    c. wager activation means for generating a wager signal, in response to action by the patron, indicating that wager information including the symbols currently selected by the keypad means is to be entered as an irrevocable wager; and
    d. processing means connectable to said central game controller and connected to the keypad means, account identifying means, and wager activation means for receiving said wager information and said account identification information, and in response to receiving said wager signal, rendering said keypad means inoperative to vary the selected symbols and irrevocably transmitting signals to said central game controller, including the wager information and the account identification information, to enter the wager information as an irrevocable wager associated with the patron account identified by the account identification information.

16. The system of claim 15 further including means for selectively displaying data describing such wagers on one or more peripheral devices associated with the central game controller.

17. The system of claim 16 wherein the central game controller includes a peripheral network with at least one workstation attached to the central game controller wherein data describing such wagers may be selectively displayed at said workstation.

18. The system of claim 15 wherein said central game controller includes printing means connected to said wager recording means for printing a hard copy record of data describing each wager.

19. The system of claim 15 wherein the writing station further includes wager amount selection means for receiving a patron input specifying an amount for the wager from a range of possible wagers prior to the operation of said wager activation means, and wherein the processing means is connected to said wager amount selection means and further includes means for receiving said specified amount and transmitting the specified amount to the central game controller.

20. The system of claim 19 wherein the central game controller includes accounting means for deducting the amount of the wager from the patron account upon receipt of the wager information.

21. The system of claim 20 wherein said accounting means includes means for adjusting patron accounts after the random drawing and prior to any public display of the results of the drawing.

22. The system of claim 15 wherein the writing station means includes card reading means for reading a card encoded with account identifying data identifying the account of the patron.

23. The system of claim 15 wherein the keypad means includes a plurality of switching means, each switching means associated with a symbol, and the writing stations further include a plurality of display elements, each with a plurality of visually distinct states, and each aligned with one of said switching means of said keypad means, the display elements displaying a first visually distinct state when the switching means associated therewith has not been activated by a patron to select a symbol, a second visually distinct state when the switching means associated therewith has been activated by a patron to select a symbol, and a third visually distinct state when a symbol associated with the display element has been chosen in the game by the central game controller.

24. An electronic cashless betting system for conducting an automated random selection game including a random drawing of a defined number of symbols from a larger defined set of possible symbols, comprising:
  A. a central game controller including
    a. account maintenance means for storing records of patron accounts, each patron account record including an account balance;
    b. wager recording means operable during a wager receiving period for electronically collecting and recording wagers comprising a patron's choice of predicted symbols and account identifying data associating the patron with one of said patron accounts;
    c. drawing means connected to said account maintenance means and wager recording means for performing said random drawing to choose the defined number of symbols;

d. accounting means associated with the drawing means for determining a required credit to a patron account according to a predefined paytable defining payoffs based on the level of coincidence between each patron's predicted symbols and the actual symbols chosen in the random drawing;

e. first automated payoff means associated with the accounting means for automatically crediting the account associated with the patron when the required credit does not exceed a defined cutoff amount;

f. second automated payoff means associated with the accounting means for automatically generating and printing tax reporting forms and indicating a special manual payout requirement when the required credit is greater than the defined cutoff amount; and g. results reporting means for transmitting results of the drawing to patrons subsequent to said wager receiving period; and B. a plurality of writing stations connected to the central game controller for receiving wager information including the patron symbol selections and account identification information, and transmitting the wager information to said central game controller during the wager receiving period to enter the wager.

25. The system of claim 24 wherein the central game controller further comprises means for establishing and storing employee identification codes and data associated with each code indicating whether the employee code carries authorization to make special manual payouts.

26. The system of claim 20 further comprising security means connected to the second automated payoff means for receiving and verifying an employee code and preventing operation of the second automated payoff means if the employee code does not carry authorization to make special manual payouts.

27. The system of claim 24 wherein the central game controller further includes tax reporting means for storing records of special manual payouts and generating required governmental tax reporting documents.

28. An electronic cashless betting system for conducting an automated random selection game including a random drawing of a defined number of symbols from a larger defined set of possible symbols, comprising:

A. a central game controller including:
 a. account maintenance means for storing records of patron accounts, each patron account record including an account balance;
 b. wager recording means operable during a wager receiving period for electronically collecting and recording wagers comprising a patron's choice of predicted symbols and account identifying data associating the patron with one of said patron accounts;
 c. drawing means connected to said account maintenance means and wager recording means for performing said random drawing to choose the defined number of symbols and crediting patron accounts according to a predefined paytable defining payoffs based on the level of coincidence between each patron's predicted symbols and the actual symbols chosen in the random drawing;
 d. results reporting means for transmitting results of the drawing to patrons subsequent to said wager receiving period; and B. a plurality of writing stations connected to the central game controller for receiving wager information including the patron symbol selections and account identification information, and transmitting the wager information to said central game controller during the wager receiving period to enter the wager;

wherein said central game controller operates using at least one secured internal data file, the unauthorized manipulation of which would affect said payoffs calculated by the drawing means, and said file has associated with it check data means calculated from the data of said file according to a defined algorithm which varies when a datum of said file is changed, and said central game controller includes verification means for verifying at specified times during the operation of the game that the data of said file, when operated on by said defined algorithm, produce check data means matching the check data means associated with said file, and for producing an indication whenever said data does not produce check data means matching the file associated check data means.

29. The system of claim 28 wherein one such secured internal data file is a file containing said paytables.

30. The system of claim 28 wherein one such secured internal data file is a file containing system configuration data.

31. The system of claim 28 wherein said check data means is calculated by applying a mathematical algorithm to a binary sum of file data.

32. The system of claim 31 wherein said mathematical algorithm varies depending on the value of the binary sum.

33. The system of claim 28 wherein said check data means associated with said data file is verified against said data in said data file immediately prior to said random drawing.

34. An electronic cashless betting system for conducting an automated random selection game including a random drawing of a defined number symbols from a larger defined set of possible symbols, comprising:

A. a central game controller including:
 a. account maintenance means for storing records of patron accounts, each patron account record including an account balance;
 b. wager recording means operable during a wager receiving period for electronically collecting and recording wagers comprising a patron's choice of predicted symbols and account identifying data associating the patron with one of said patron accounts;
 c. drawing means connected to said account maintenance means and wager recording means for performing said random drawing to choose the defined number of symbols and crediting patron accounts according to a predefined paytable defining payoffs based on the level of coincidence between each patron's predicted symbols and the actual symbols chosen in the random drawing;
 d. double entry accounting means connected to the drawing means for applying a corresponding debit to a control account whenever a credit is applied to one of said patron accounts to maintain a constant total value of a defined group of accounts in the system; and e. results reporting means for transmitting results of the drawing to patrons subsequent to said wager receiving period; and B. a plurality of writing stations connected to the central game controller for receiving wager information including the patron symbol selections and account identification information, and transmitting the wager information to said central game controller during the wager receiving period to enter the wager.

35. The system of claim 34 further comprising means associated with the writing stations for receiving a patron input specifying the amount of the wager from a range of possible wagers prior to said writing station receiving an input indicating that wager selection is complete, and wherein the writing stations further include means for irrevocably transmitting to the central game controller data defining the wager amount as part of the wager information upon receiving said input indicating wager selection is complete.

36. The system of claim 35 wherein the double entry accounting means further includes means for deducting the amount of the wager from the account associated with the patron shortly after receipt of the ticket data while making a corresponding credit to a control account, and crediting the account associated with the patron appropriately, based on the amount of the wager, following the random drawing, while said double entry accounting means debits said control account to maintain at all times a constant total value of said defined group of accounts in the system.

37. The system of claim 34 wherein said central game controller further comprises account security means for summing said defined group of accounts at defined times during operation of the central game controller means to confirm that said total account value is equal to said constant value.

38. The system of claim 37 wherein the central game controller further includes means associated with said account security means for providing an indication whenever said total account value is not equal to said desired constant.

39. An electronic cashless betting system for conducting an automated random selection game including a random drawing of a defined number of symbols from a larger defined set of possible symbols, comprising:

A. a central game controller including:
 a. account administration means for storing records and account balances of at least two distinct types of patron accounts, a first type of account having a predetermined fixed starting value and a second type of account having a variable starting value determined by the patron at the time the account is opened;
 b. wager recording means operable during a wager receiving period for electronically collecting and recording wagers comprising a patron's choice of predicted symbols and account identifying data associating the patron with one of said patron accounts;
 c. drawing means connected to said account maintenance means and wager recording means for performing said random drawing to choose the defined number of symbols and crediting patron accounts according to a predefined paytable defining payoffs based on the level of coincidence between each patron's predicted symbols and the actual symbols chosen in the random drawing;
 d. results reporting means for transmitting results of the drawing to patrons subsequent to said wager receiving period; and B. a plurality of writing stations connected to the central game controller for receiving wager information including the patron symbol selections and account identification information, and transmitting the wager information to said central game controller during the wager receiving period to enter the wager.

40. The system of claim 39 wherein the central game controller includes personal information maintenance means for maintaining personal descriptive information including the name of the patron associated with the account for said second type of account and for maintaining a lesser amount of said personal descriptive information for said first type of account.

41. The system of claim 39 further comprising means for maintaining and tracking said first type of accounts in groups according to the entity responsible for distributing said accounts to patrons.

42. An electronic cashless betting system for conducting an automated random selection game including a random drawing of a defined number of symbols from a larger defined set of possible symbols, comprising:

A. a central game controller including:
 a. account maintenance means for creating and storing records of patron accounts, each patron account record including an account balance;
 b. wager recording means operable during a wager receiving period for electronically collecting and recording wagers comprising a patron's choice of predicted symbols and account identifying data associating the patron with one of said patron accounts;
 c. drawing means connected to said account maintenance means and wager recording means for performing said random drawing to choose the defined number of symbols and crediting patron accounts according to a predefined paytable defining payoffs based on the level of coincidence between each patron's predicted symbols and the actual symbols chosen in the random drawing;
 d. cash management means for changing the value of accounts in response to cash transaction data entered into a terminal associated with said central game controller, said transaction data indicative of cash received or paid out of a cash storage means associated with said terminal, wherein said central game controller means includes monitoring means for receiving data indicating the initial value of cash in the cash storage means and thereafter maintaining, based on said transaction data, a calculated expected amount of cash remaining in said cash storage means, and for selectively displaying said expected amount of cash in response to an input by system operating personnel; and
 e. results reporting means for transmitting results of the drawing to patrons subsequent to said wager receiving period; and B. a plurality of writing stations connected to the central game controller for receiving wager information including the patron symbol selections and account identification information, and transmitting the wager information to said central game controller during the wager receiving period to enter the wager.

43. The system of claim 42 wherein the game controller further comprises logging means for logging substantial descriptive data for transactions including each wager and cash transaction processed by said system, said substantial descriptive data including data describing the amount of each transaction, the type of transaction, and the employees involved, and said game controller means further includes report generating means for selectively generating reports summarizing transactions of interest that occurred during defined periods of interest.

44. The system of claim 43 wherein the report generating means includes means for generating transaction summaries for specified working shifts.

45. The system of claim 43 wherein said logging means comprises means for logging data identifying the writing station involved in a transaction and the reports include said report generating means comprises means for generating reports summarizing activity at each writing station.

46. The system of claim 45 wherein the logging means comprises means for logging errors and calls for assistance, and said reporting means comprises means for generating reports summarizing activity at particular writing station means suggesting a maintenance problem, including at least one of calls for attendant service from said writing station means, power failures, and card reader errors.

47. The system of claim 43 wherein said reporting means comprises means for generating reports on the transaction processing history of a specified employee operating said terminals.

48. The system of claim 43 further comprising transaction log backup means for maintaining said transaction log on at least two storage means operating in parallel such that failure of one of the said storage means will not cause loss of transaction log data.

49. The system of claim 43 further comprising hard copy means for generating substantial descriptive data for at least certain defined classes of transactions logged by the central game controller means in permanent hard copy form at the time of the transaction on a peripheral device connected to the central game controller means.

* * * * *